QUADRATURE SELECT, MULTICHANNEL INDEPENDENT SIDEBAND SYSTEM

Filed March 15, 1967

INVENTOR.
ANTHONY C. PALATINUS

BY Ernest J. Weinberger
Louis B. Applebaum
ATTORNEYS

May 26, 1970 A. C. PALATINUS 3,514,701

QUADRATURE SELECT, MULTICHANNEL INDEPENDENT SIDEBAND SYSTEM

Filed March 15, 1967 9 Sheets-Sheet 2

INVENTOR.
ANTHONY C. PALATINUS

BY Ernest J Weinberger
Louis B. Applebaum
ATTORNEYS

INVENTOR
ANTHONY C. PALATINUS
BY Ernest F. Weinberger
Louis B. Applebaum
ATTORNEYS May 26, 1970 A. C. PALATINUS 3,514,701

QUADRATURE SELECT, MULTICHANNEL INDEPENDENT SIDEBAND SYSTEM

Filed March 15, 1967 9 Sheets-Sheet 4

INVENTOR.
ANTHONY C. PALATINUS

BY Ernest J Weinberger
Leon B. Applebaum
ATTORNEYS

May 26, 1970 A. C. PALATINUS 3,514,701

QUADRATURE SELECT, MULTICHANNEL INDEPENDENT SIDEBAND SYSTEM

Filed March 15, 1967 9 Sheets-Sheet 5

INVENTOR.
ANTHONY C. PALATINUS

BY Ernest F. Weinberger
Louis B. Applebaum
ATTORNEYS

INVENTOR.
ANTHONY C. PALATINUS
BY Ernest F. Weinberger
Louis B. Applebaum
ATTORNEYS

QUADRATURE SELECT, MULTICHANNEL INDEPENDENT SIDEBAND SYSTEM

INVENTOR.
ANTHONY C. PALATINUS
BY Ernest J. Weinberger
Leon S. Cazzola
ATTORNEYS

QUADRATURE SELECT, MULTICHANNEL INDEPENDENT SIDEBAND SYSTEM

Filed March 15, 1967 9 Sheets-Sheet 8

INVENTOR.
ANTHONY C. PALATINUS

BY Ernest F. Weinberger
Louis S. Gyzyleb...
ATTORNEYS

QUADRATURE SELECT, MULTICHANNEL INDEPENDENT SIDEBAND SYSTEM

Filed March 15, 1967 9 Sheets-Sheet 9

INVENTOR.
ANTHONY C. PALATINUS
BY Ernest F. Weinberger
Leon B. Coppleman
ATTORNEYS United States Patent Office 3,514,701

Patented May 26, 1970

3,514,701

QUADRATURE SELECT, MULTICHANNEL INDEPENDENT SIDEBAND SYSTEM

Anthony C. Palatinus, 15 Rooney, Maspeth, N.Y. 11542

Filed Mar. 15, 1967, Ser. No. 624,122
Int. Cl. H04b *1/66, 1/68;* H04j *1/00*
U.S. Cl. 325—50 9 Claims

ABSTRACT OF THE DISCLOSURE

A quadrature select, multichannel independent sideband (MC–ISB) communication system employing an audio quadrature phase shift filtering technique termed "intermediate quadrature modulation" (IQM). The "IQM" process utilizes an unoccupied spectrum bandslot resulting from a frequency sideband displacement. A direct modulation path centers the modulation input within the vacated channel region. Simultaneously, in an intermediate quadrature operation that phase interrelates an audio quadrature carrier signal with a pair of audio offset I.F. carrier signal, locates the modulation input in a formerly used corresponding channel. Thereafter, the quadrature sidebands are symmetrically filtered, amplitude equalized, and time delay compensated, to additively combine and produce the desired SSB result.

The invention described herein may be manufactured and used by or for the Government of the United States of America for governmental purposes without the payment of any royalties thereon or therefor.

This invention relates to the generation and transmission, and the reception and detection in single-sideband communications, and in particular to modulation methods and the associated instrumentation that provides for the receiving and the transmission of data sideband information only, selectable either in the upper or lower sideband. Further, this invention concerns multiple sideband channels that may be transmitted simultaneously with each sideband channel carrying different modulation information. Such communication systems mode of operation, being known as multi-channel independent sideband operation that satisfies the universal need for efficient spectrum administration and optimum bandwidth employment, commonly designated ISB, is highly desirable; and techniques for handling a multitude of independent sideband information traffic are increasingly important for best operation of communications systems in the high frequency range of 2–30 mcs. Recently, to secure maximum transmission capabilities in this already crowded frequency region, data and multiplex communication systems, as well known, are prominently receiving considerable attention. To achieve both flexibility and full channel capacity in a more economical manner, a voice and data ISB mode of transmission is therefore desirable and necessary. Consider four separate and distinctly different audio input modulation signal sources, such as normal voice, frequency shift keying, inverted speech and data information, or say four different voice messages, being applied to separate modulating channel inputs of an ISB transmission system, such inputs being simultaneously transmitted as the upper and the lower sideband channel pairs about the final carrier frequency at which the transmitter is operating. In such operation, it is important to minimize cross-modulation effects and the undesired sideband channels must be readily suppressed to a negligible level. An equally important requirement is securing the maximum suppression of the carrier frequency itself for the ISB operation with allowances for carrier reinsertion when compatible AM operation of one SSB channel of the system is desired. The requirement of attaining these two necessary SSB transmission characteristics, one being full unwanted sideband suppression, and the other being full carrier suppression, has been met by the basic modulation method described and shown in the inventor's "Independent Sideband Transmission System," Pat. No. 3,217,256 dated Nov. 9, 1965.

This present invention is related thereto by integrally advancing a new and complementary method of intermediate quadrature function modulation selectable within a composite multi-channel ISB communications system exhibiting alternative usage of similarly operative stages having a maximum degree of commonality but with significantly differing signal processes.

There are two main types of SSB modulation systems which are utilized in the present state-of-the-communications-art. The first type, most prominently used, is the well known classical filter method where a asymmetrical type sideband filter is of sufficient selectivity and bandwidth to pass but one sideband as desired and reject the unwanted sideband.

The second type system, less frequently used, is the phasing method where a pair of double sideband signals resulting from a pair of balanced modulators receiving their modulating and carrier signals phased in quadrature so that the two double sideband signals are added together. The desired sideband is thus reinforced with the other undesired sideband being phase cancelled in destructive addition. Specialized modifications of these basic approaches exist for one sideband operation only. Prior art describes like pairs of such type communications systems with dual channels where separate input signals representative of differing intelligence or dissimilar information may be simultaneously transmitted.

The limits and faults of prior art transmission systems of the sideband filter type have been delineated in the above mentioned patent, and particularly so where independent sideband (ISB) operation is involved.

For the phase method of SSB communications, the particular difficulty of providing and maintaining the 90 degree phase shifting of the relatively wide audio bandwidth of say 300 c.p.s. to 3300 c.p.s. is a deficiency well recognized in the communications art. However, this phase shift method is useful in single frequency operation and this type technique is exemplified herein as a convenient alternative approach in the generation of a pair of oppositely offset oscillator frequencies. Other remaining techniques require a duplication of the stages of the specially modified approach, such as in square law SSB systems and other compatible SSB systems. For these special cases, ISB operation is usually not featured since cost and complexity precludes such use.

Presently, non-regenerative parametric up-converters are being introduced as HF–SSB receiver pre-selectors, and these sub-system units are known to support dynamic ranges of 130 to 140 db. Further reception improvements appear forthcoming as reported in the technical paper "Effective Enhancement of Receiver Dynamic Range" authored by S. Perlow and B. Bossard, and published in Frequency, July–August 1966 issue, pages 30 to 33.

Obviously, to acquire the full benefits in an overall communications system, an equal or better transmission spectral purity is demanded. Here, the advantageous features obtained from the added suppression range operation produced by the inventor's prior ISB transmission system becomes increasingly clear. However, envelope delay is known as an important characteristic in filter application where minimum distortion of the transmission signal is required in passing through communication networks. Nearly constant envelope delay over the electrical bandpass region is desired, where pulsed sinusoids, steep-front modulation envelopes and other complex waveforms of modern telecommunications are the information bearing signals. A constant envelope delay is expressed as a linear phase shift variation with frequency, and the time delay itself is defined as the phase-frequency characteristic slope or the mathematical derivative of phase with respect to frequency. Within asymmetrical filter paths, non-uniform delay responses develop, and the providing of a Communication System technique that accurately preserves complex waveforms is urgently required to overcome such deficiencies. Thus it is desired to retain the above featured advantages and yet bring forth greater utilization as required for reliable long distance message interchange of differing information.

This instant invention of a fundamental method of communication does not utilize the conventional multichannel modulation techniques and has neither the dynamic range limitations experienced in prior voice transmissions nor the duplicating complexity or phasing deficiencies encountered heretobefore in the prior handling of data waveform messages where ISB operation is required.

To effectively accommodate such noticeably diverse needs, a duo-modulation process is featured herein which establishes multi-channel operation by the effectation of voice band translation to a new spectrum center point of 7.2 kc. with outboard channel location within the basic frequency offset ISB transmission system. Combined with the above is a selectable intermediate quadrature function inboard channel operational mode within the basic frequency offset now multi-channel ISB transmission system for data communications. Such an intermediate quadrature channel (IQC) is used to locate the quadratured modulation signals in a spectrum band having a mid-frequency center at 3600 c.p.s. In this manner a bidirectional signal operation is achieved by way of transceiver system performance, where normal three channel transmission is effected while reception is made over the intermediate quadrature function inboard channel on a time-sharing basis.

As such, this integrated communications system formulates an interlaced radio link exhibiting functional complements that possess the intrinsic properties for handling differing information data via its most appropriate modulation mode within adjacent inboard channels having a common carrier frequency identification.

With the selectable companion usage of a common band slot channel, through a high degree of voice controlled switchable stage commonality, the plurality conditioning of the duo-modulation combination is appropriately categorized as a method of Pal Isoplex Communications, the import of which becomes clearer from the technical description that follows.

A broad objective of this instant invention is to enhance upon, and uniquely extend the utilization of the basic modulation properties first presented in aforementioned U.S. Pat. No. 3,217,256, into the novel method of intermediate quadrature modulation; and producing therefrom a compositely integrated duo-modulation communications system. It is thus the object of this invention to introduce the establishment of a versatile, flexible, reliable method in a bi-directional radio link for long range voice and data ISB communication channel operation.

Another object is to furnish additional traffic handling capability for a communications system that allows support of multi-ISB channels in the high frequency range and having a sideband selection of two upper sideband channels and two lower sideband channels; (denoted as two outboard sideband channels and the two inboard sideband channels) as so desired; and simultaneously providing the selectability of either of the inner located channel bands as an intermediate quadrature modulated channel for reliable data communications.

It is also an object of this invention to expand the basic two channel ISB transmission system of inventor's prior patent to produce a four channel ISB operation with a high degree of stage commonality and full suppression of the unwanted sidebands.

A further object of this invention is to provide for use of conjunctive symmetrical passband filters between the inboard and the adjacent channels to reduce between channel crossover and distortion effects.

This invention has the added object of providing a mode of operation for privacy where inverted speech may be brought about within an intermediate quadrature type channel.

Still another object of this invention is to provide for transceiver operation whereby a composite receiver-transmitter forms a multi-channel communications system such that three channels transmit while one selected inboard intermediate quadrature channel remains usable for single sideband (SSB) transmission reception in a time-showing manner alternating data and voice.

The scope of this new modulation approach is of the broadest consideration, and a pair of preferred embodiments are featured herein. For voice modulation, communication is of the analogue system type, but the message reliability of data information necessitates the system performance effectiveness obtainable from a digital type operation.

Advantages on a performance effectiveness basis become obvious since the fullest utilization of the spectrum bandwidth is made in a composite mode operation coupled with a selectable intermediate quadratic function modulation method requiring a minimum of newly added stages in conjunction with the common stage duality throughout.

It is not difficult to appreciate that the above stated objectives are not easily achieved. However, in accord with the principles of this invention, the factually disclosed and significant signal process techniques reveal applicable results whereby the advantageous goals are attained.

Realization of the clear value derived from the resultant operational techniques founded upon the innovations originating herein will come into sharper focus in the light of the forthcoming discussion of the new modes of communication. As may be reasoned from the following description, other objects and advantages of this invention will become evident and the uniquely distinct features will be particularly pointed out in the appended claims.

In the accompanying drawings:

FIGS. 1(*a*), 1(*b*) and 1(*c*) are elementary overall block diagrams of one embodiment of "Quadrature Select, Multi-Channel Independent Sideband Communications System" in accordance with the principles of this invention; wherein FIG. 1(*a*) illustrates the audio excitation section and FIGS. 1(*b*) and 1(*c*) each illustrates the sideband modulation and common IF-RF sections.

Figure 4A:
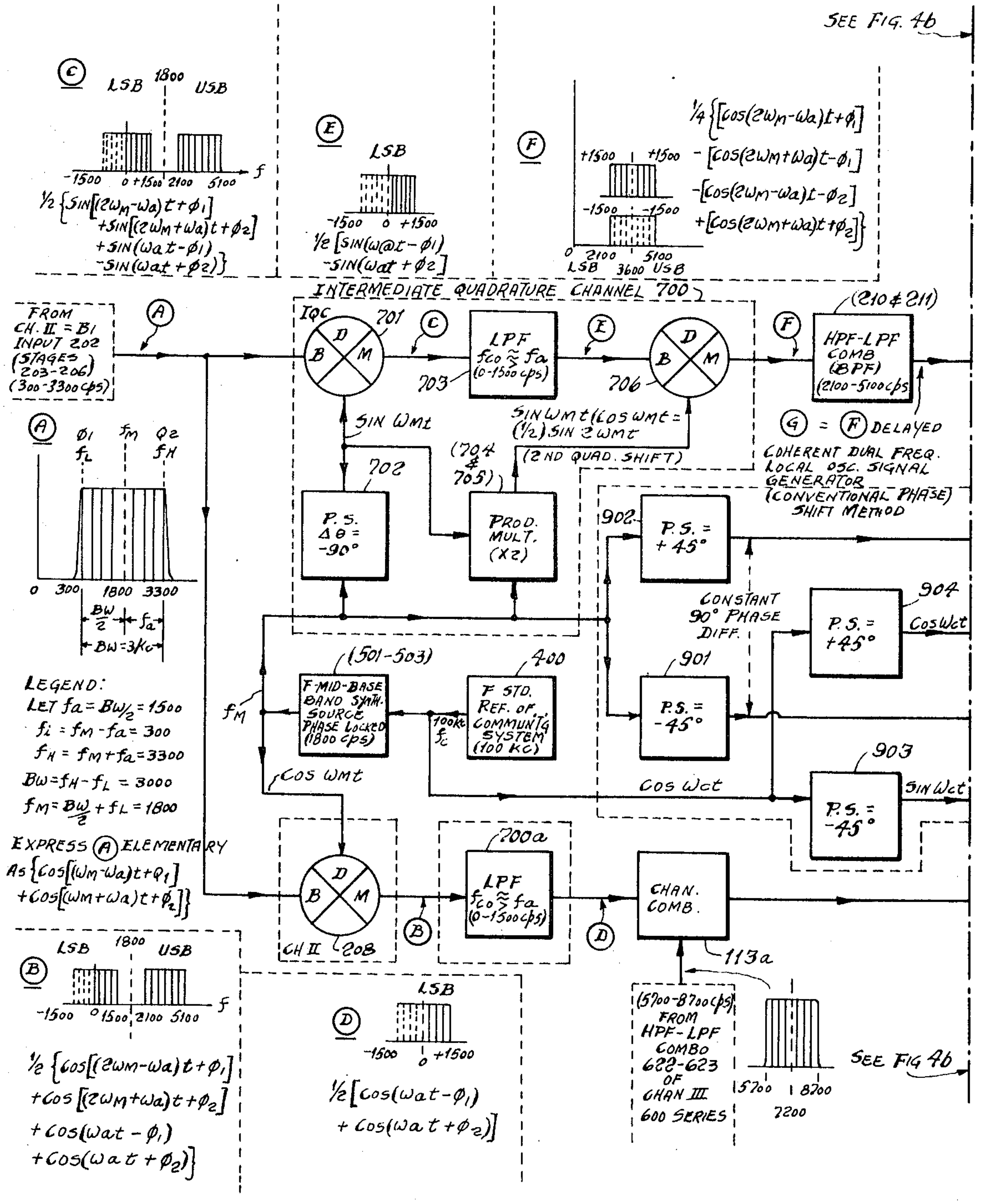
Figure 4B:
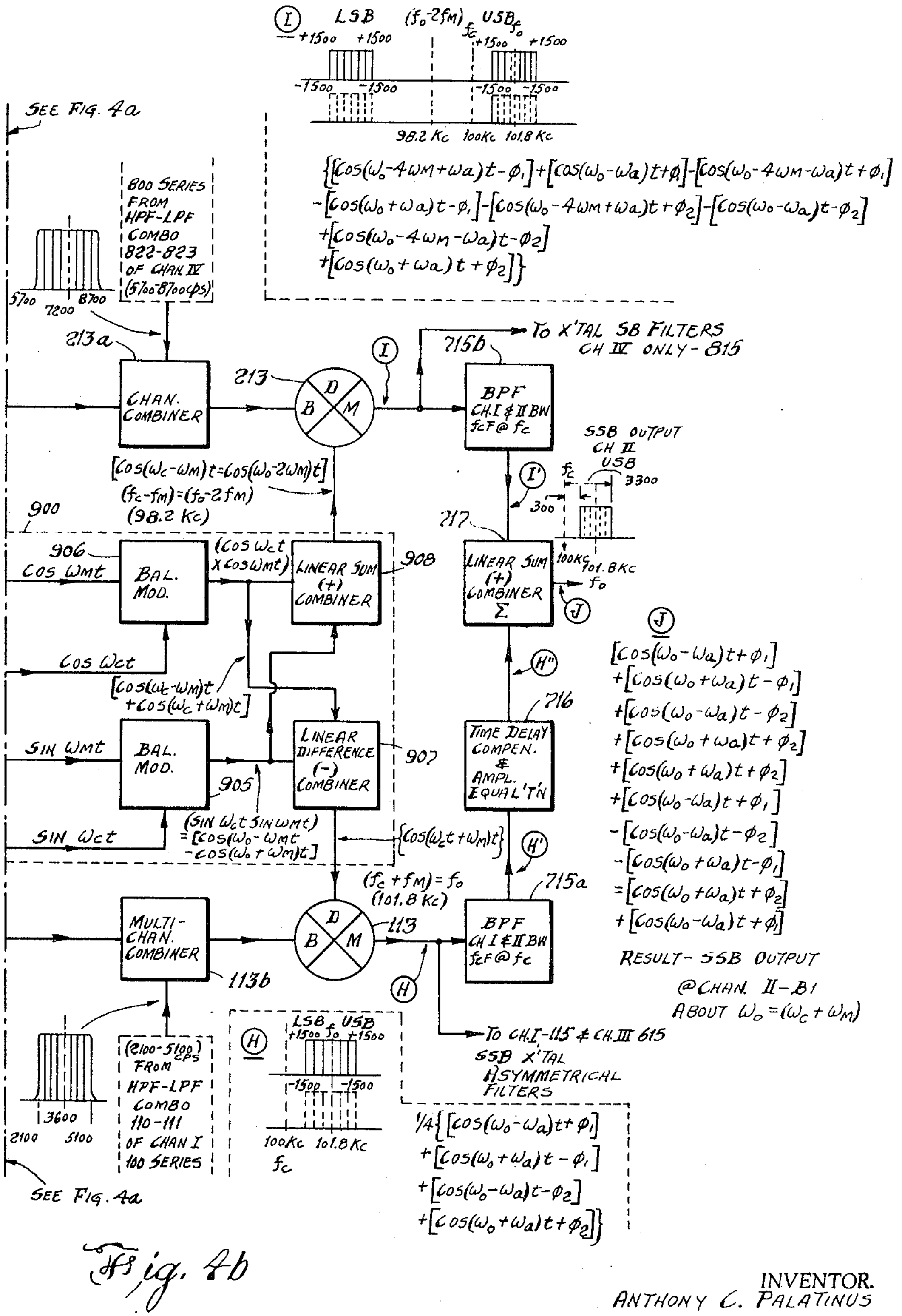

FIGS. 4(*a*) and (*b*) are symbolic circuit arrangement representations of an alternative embodiment for the "Intermediate Quadrature Modulator" function mode selection that present the signal processing analysis set for Mode 2 at channel II in accordance with the principles of this invention.

Figure 5A:
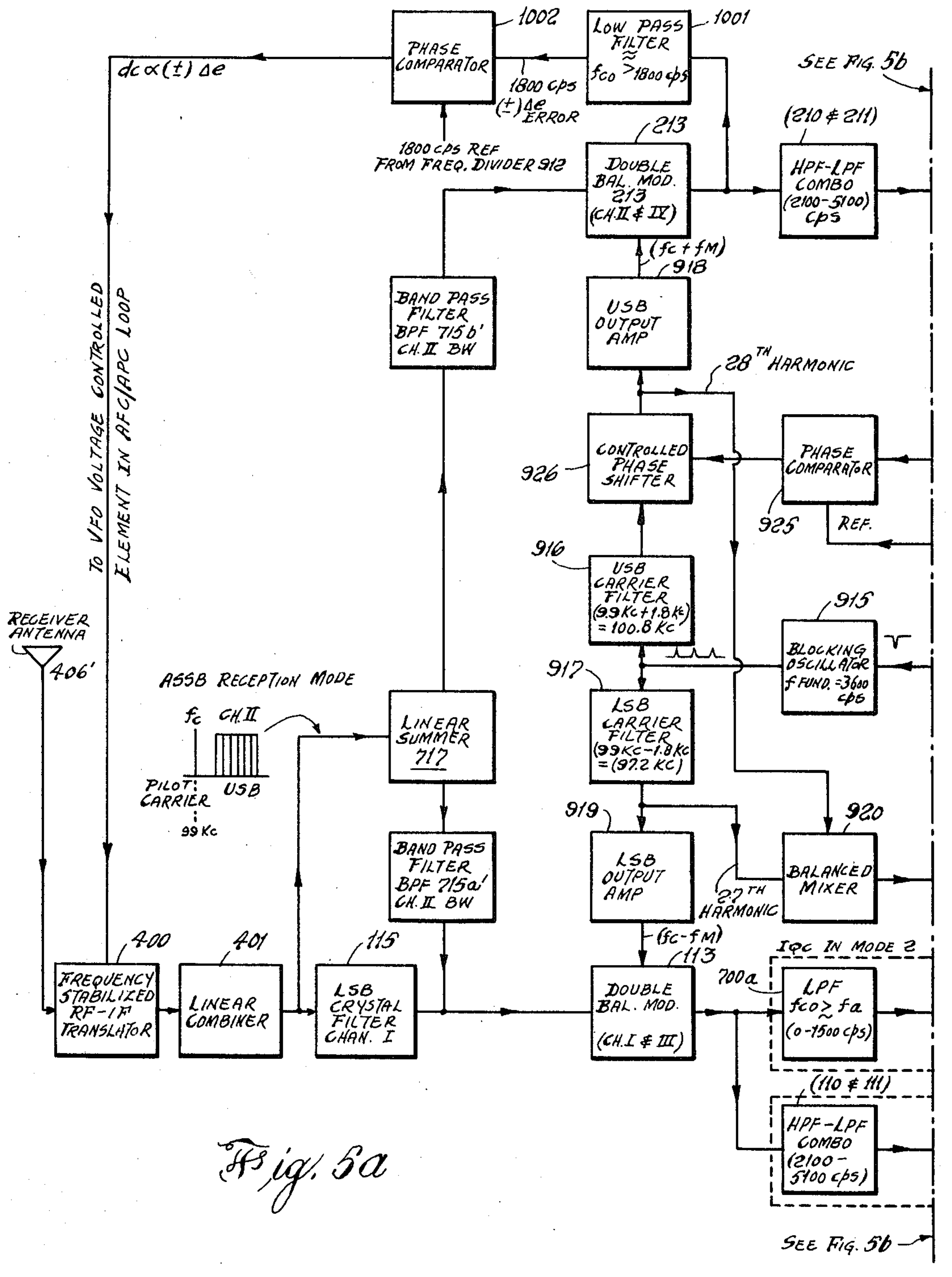
Figure 5B:
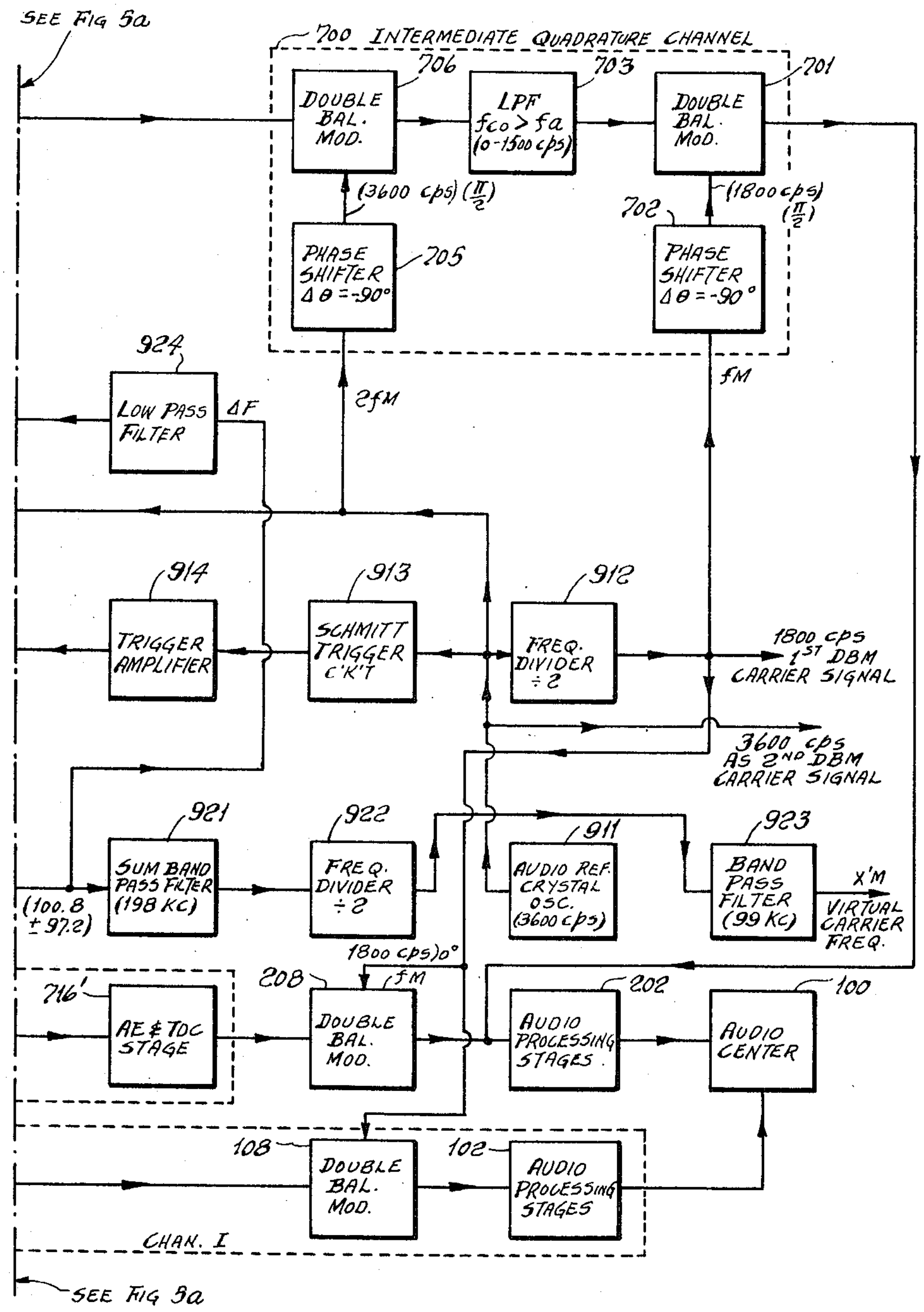

FIGS. 5(*a*) and (*b*) are elementary block diagrams illustrating an alternative structure accomplishing communication reception in accordance with the principles of this invention.

The disclosure of the aforementioned patent serves in its entirety as an integral support of this present specification. In the main, the referenced material therein will not be repeated in detail except at points where restatement of such explanations are deemed necessary for complete understanding of the instant application.

Figure 1A:
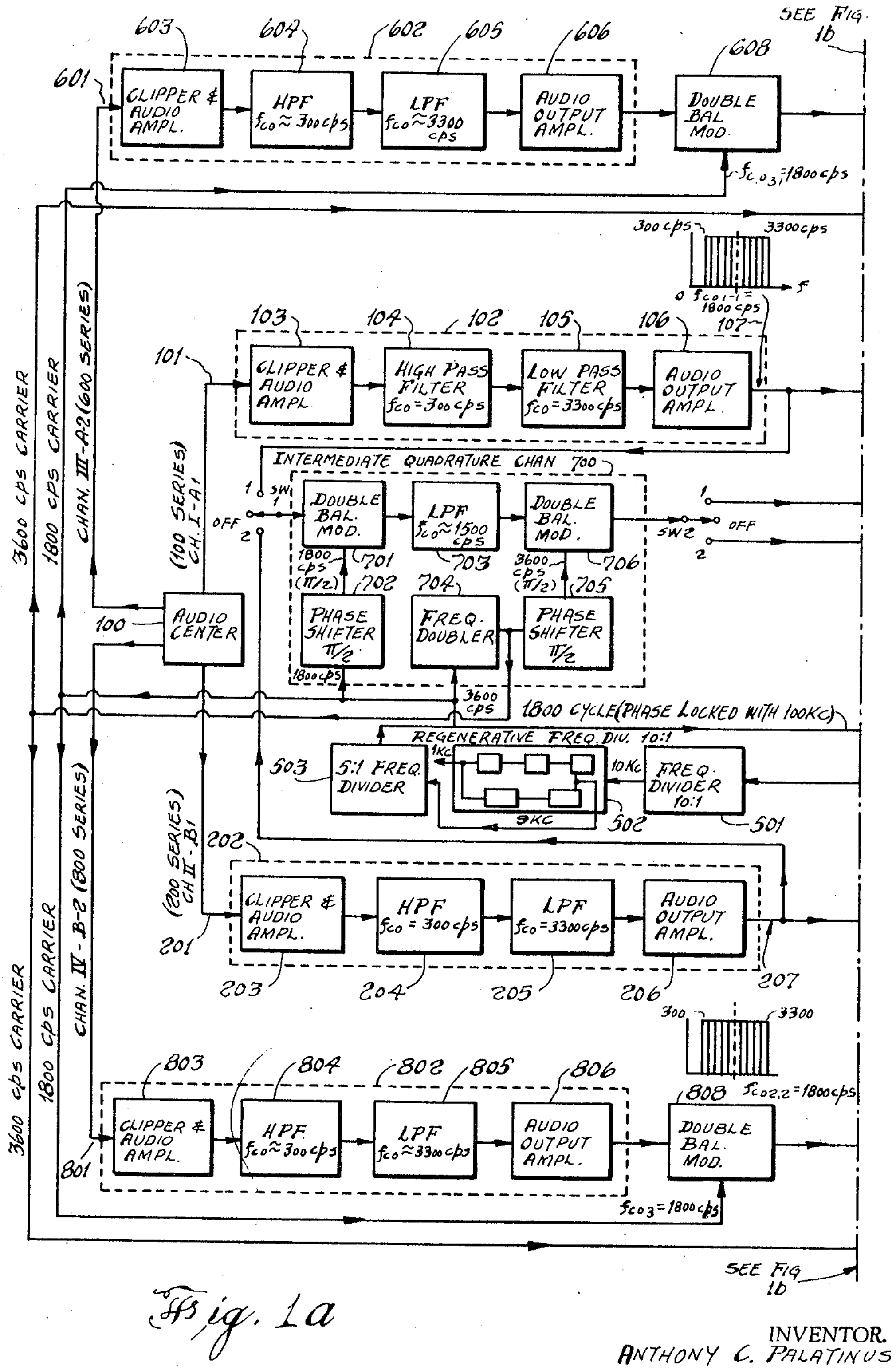
Figure 1B:
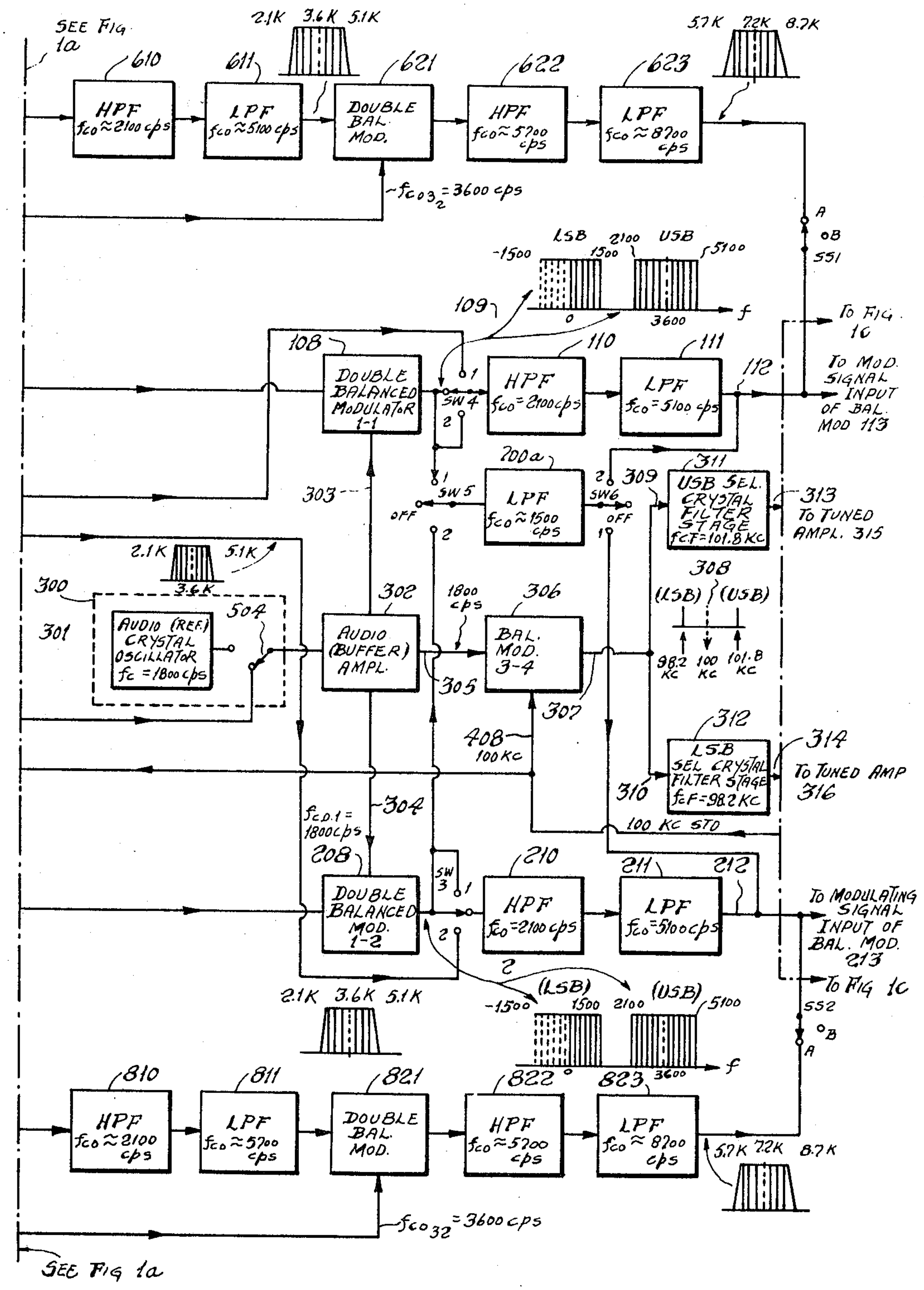
Figure 1C:
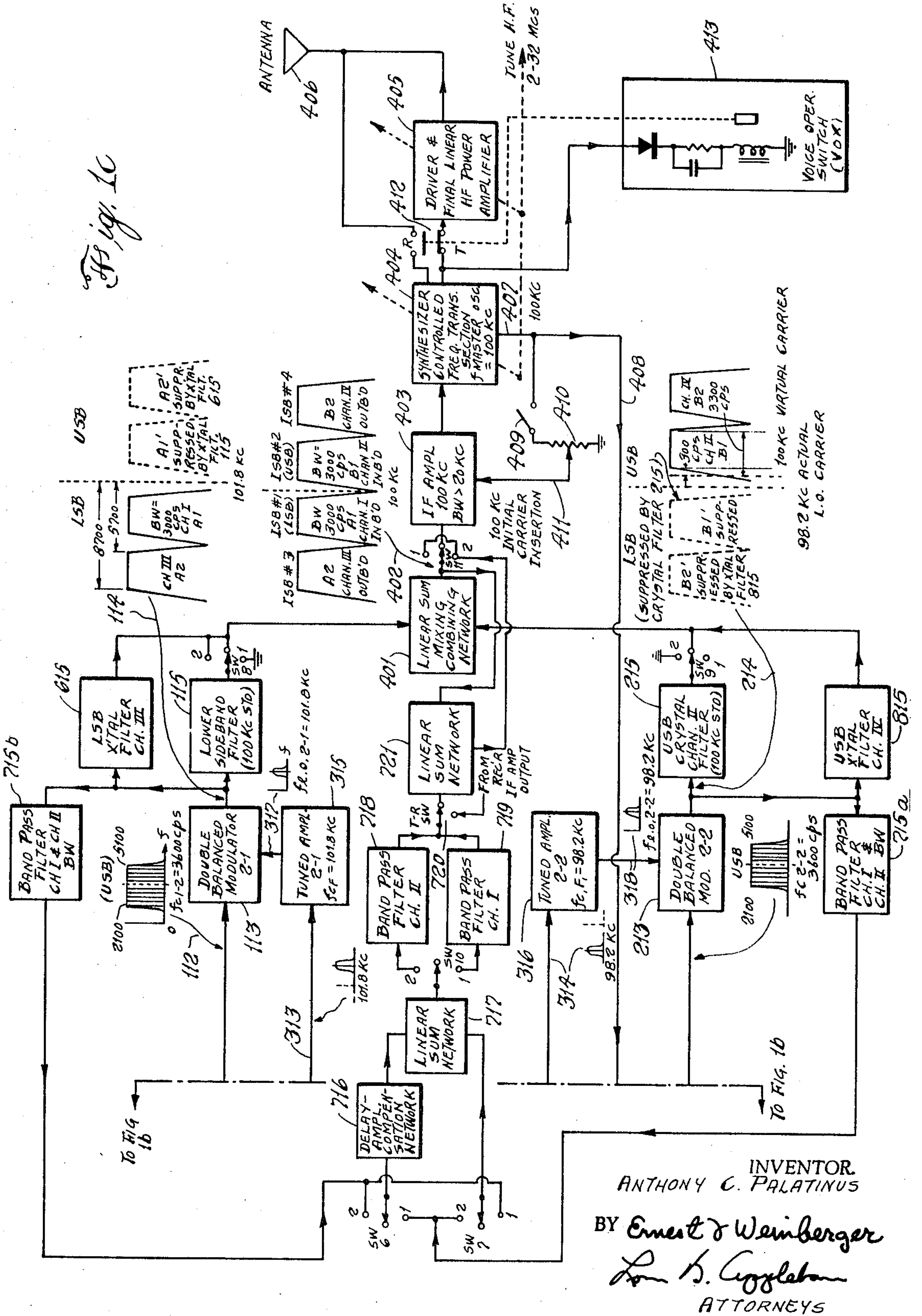

*Voice band multi-channel operation.*—This specification concerns the "intermediate quadrature mode" operation at position two (2) which, as illustrated in FIG. 1, selects the upper sideband (USB) B1, channel II band. The circuit arrangement of the communications system is shown in the normal, or neutral, or off, position; which for channels I and II remains the same, similarly as that described in the inventor's prior mentioned transmission system. Position 1 similarly concerns the lower sideband (LSB).

In position 2, the operation of channel I, A1, remains as given and described in the Pat. 3,217,256 and essentially repeated herein. The sideband filter operation of channel II, B1, is no longer maintained but is replaced by a quadrature channel. Removal of the prior channel II sideband filtered voice modulation information is accomplished by converting the channel operation into its quadrature mode in association with a newly introduced "Intermediate Quadrature Channel" (IQC), where common use of functional stages may be repeatedly made. The operation of the outboard channels III–A2 and IV–B2 are always in effect for transmission.

Attention is now first given to normal multichannel ISB operation as an advancement over the inventor's previous transmission system where only two ISB channels were introduced. Thereafter, the fully unique flexibility possessed by this present invention is described with respect to intermediate quadrature select mode. While the description is made for selectability between inboard channels I and II and normal operation via a three way switching arrangement, it will be pointed out that a surprisingly fruitful method of communications is acquired from a time-sharing voice operated switch control between the two positions of normal (or off) and quadrature (1 or 2).

In the overall FIG. 1, (including subscripts) is a block diagram of an embodiment employing the principle of this invention. An audio or message intelligence network center 100 provides designated inputs of A1, B1, A2 and B2 to channels I, II, III, and IV respectively. The center 100 is well known in the art consisting of conventional terminal equipments as part of the communications system that further provides switching networks for a variety of signals and combinations. The four band outputs of the center 100 are shown simultaneously applied to the speech processing portions 102, 202, 602 and 802 of channels I, II, III and IV, respectively.

The speech processing channels serve to limit peak amplitudes and spectrum bandwith of the voice input to the audio range of interest which, for this illustrative example, is set to be from 300 c.p.s. to 3300 c.p.s. for a channel bandwidth of 3000 c.p.s. This is a fairly standard bandwith in frequent use, but it is not to be construed that the transmission system itself is band limited, for, differing bandwiths can be provided in any specific design application.

Since operation of a portion of channels III and IV develops to be the same of channels I and II, then for the moment, consider the signal processing that occurs in channel I, where likewise the description applies to channel II item stages given within the enclosing parentheses.

The speech processing is accomplished in a conventional manner where for channel I (102) and equally well for channel II, the voice modulation input at 101 (201) is applied to clipper and audio amplifier stage 103 (203) input, the output of which is then applied to a band limiting combination of high pass filter 104 (204), being followed in cascade with a low pass filter 105 (205). With the high pass filter network being set for a cut-off frequency, $f_{c.o.}$, of 300 c.p.s. and the low pass filter section cutting off at 3300 c.p.s. resulting in a total bandwith of 3000 c.p.s. The passband frequency region is flat and unattenuated, with relatively sharp and steep skirts. Audio output amplifier 106 (206) serves to apply this passband of interest (see 107 (207)) to the double balanced modulator 108 (208).

Modulators 108 and 208 are product modulators of the double balanced type. A product modulator serves to produce a resultant output which is proportional to the product of the two input signals applied to it. Comparatively a single balanced arrangement secures effective cancellation or suppression of the local oscillator signal input, which is commonly referred to as the carrier input signal, in the output of the modulator. A double balance modulator, however, functions to eliminate the appearance of the input (voice) modulating signal in the output of the modulation in addition to the carrier signal being cancelled.

Mathematically, the modulation operation can best be described in the following manner and terms conventionally used. Let the signal input to say channel I be expressed as a complex waveform consisting of a summation of sinusoidal terms, such that—

$$e_{i1}(t)=\sum_{n=1}^{N} E_n \cos (W_n t+\phi_n)$$

where $E_n$ is the peak amplitude of the *n*th term, $W_n$ is the angular frequency associated with $E_n$, and $\phi_n$ is an arbitrary phase angle associated with $E_n$. It is to be noted that a similar input is applicable simultaneously to channel II input and that the analysis of channel I applies equally to channel II for the first modulation action. The high-pass-low-pass filter cascade combination in the channel speech processing circuits 102 and 202 prior to the double balanced modulators serve to formulate the flat or zero attenuation bandpass region of bandwidth, W, where the input audio frequencies are limited to $$f_{low} \leqq f_n \leqq f_{low}+W$$

as they appear at the modulating signal input of the double balanced modulator.

Now consider the application of a carrier input to the modulation of fixed (reference) frequency value and having, for convenience, a unit amplitude. The double balanced modulator is of the product modulator type having its double balanced arrangement set to suppress the appearance of the carrier input in its output, this being the first or single balance; and further suppressing the appearance of the modulating signal input frequencies in its output, this being the second or double balanced condition. It is known that a product modulator secures a resultant output signal that is proportional to the amplitude product of the two input signals, that is, the product of the carrier and the modulating signals. The multiplication process in which two time-functions are multiplied together is expressed in the following manner:

$$e_{o_{i-1}}=e_{i_1}(t) I \cos W_{c_1} t$$

where I is the unity peak amplitude of the carrier frequency signal, $W_{c_1}$ is the angular frequency of the carrier wave and $e_{o_{i-1}}$ is the time relationship of the modulator's output wave. By substitution, $$e_{o_{i-1}}=\sum_{n=1}^{N} E_n \cos (W_n t+\phi_n) \cos W_{c_1} t$$

which by trigonometric expansion becomes $$e_{o_{i-1}}=\tfrac{1}{2}\sum_{n=1}^{N} \{E_n \cos [(W_n-W_{c_1})t+\phi_n] + E_n \cos [(W_n+W_{c_1})t+\phi_n]\}$$

Hence the double sideband output of a product modulator consists of difference frequency product terms of $(W_n - W_{c1})$ and sum frequency product terms of $(W_n + W_{c1})$. Now let the carrier frequency $f_{n1}$ be chosen as equal to the sum of the lowest input modulating frequency $f_{n1ow}$ plus the frequency amount that is equal to one-half the bandwith W to which modulation frequency $W_n$ is limited. Thus, $$f_{c1} = f_{n1ow} + \frac{1}{2}W$$

which also represents the center frequency value of the bandpass region that is allowed to the modulating spectrum input, and may be expressed as:

$$f_{c1} = \frac{1}{2}(f_{n1ow} + f_{nhigh})$$

In effect, the carrier frequency is positioned at the center of the band limited voice spectrum. Here this technique serves to locate the difference frequency components about the zero frequency axis or D.C. term, with the highest physically realizable frequency (negative frequencies being (non-existant)), being at a value equal to one-half of the bandwidth of the input channel (½ W).

In balanced modulator operation, the sum terms can be referenced as the upper sideband content and the difference terms as the lower sideband content, with the minimum frequency separation between the two sideband being equal to twice the lowest input modulating frequency or $2 \times f_{low}$. Here high pass-low pass cascade filters are used to select the upper (sum terms) sideband and attenuate the lower (difference term) sideband. The cut-off frequency of the high-pass filter is set at $$f_{c.oHP} = (\frac{1}{2}W + f_{low})$$

which is the lowest frequency value existing in the upper sideband output. The cut-off frequency for the low pass section then becomes $$f_{c.o.\ LP} = W + f_{c.o.\ HP} = (\frac{3}{2}W + 2f_{low})$$

A new band of modulating frequencies is thereby provided which exists between the limits of $$(\frac{1}{2}W + 2f_{low}) \leqq f_{new} \leqq (\frac{3}{2}W + 2f_{low})$$

The modulating input signal bandwidth as shown in 107 (or 108) is confined by the band filtering between the limits of lower frequency value 300 c.p.s. ($f_{low}$) and upper frequency value 3300 c.p.s. ($f_{high}$), for a total spectrum bandwidth of 3000 c.p.s. The ($f_{cBW}$) center frequency location of this spectrum portion of interest thus locates itself at $$f_{cBW} f_{low} + \frac{1}{2}BW = 300 \text{ c.p.s.} + \frac{1}{2}(3000 \text{ c.p.s.})$$

or at 1800 c.p.s. This value then determines the carrier signal frequency value that is to be applied to the double balanced modulators 108 and 208. The generation of this 1800 c.p.s. carrier signal will be described hereinafter, it being sufficient for present purposes to state that it is exceedingly stable frequency, of high accuracy, with the proper carrier signal level being applied.

The modulator delivers a double sideband output structure such as shown 109 (209). The lower sidebands' content, which constitute the difference frequency product terms, centers itself about the zero frequency axis (i.e. D.C.) such that it has frequency limits of ±1500 c.p.s. for its 3,000 c.p.s. bandwidth. The negative frequency values are not of physical interest and only the portion from 0 to 1500 c.p.s. is actually realizable. The upper sideband of the double sideband output has its frequency component content consisting of sum frequency product terms, and accordingly centers itself about the sum term of the input band center frequency value and the carrier frequency value to the modulator which has been set to be equal, thus giving a spectrum band center in the output of 1800 c.p.s. and 1800 c.p.s.=3600 c.p.s. Here the frequency limits for the 3000 c.p.s. bandwidth become 3600 c.p.s.±1500 c.p.s. or (3600−1500)=2100 c.p.s. as the lower frequency limit and (3600+1500)−5100 c.p.s. for the upper frequency limit. The minimum frequency separation between the two sideband structures of the double sideband output of the modulator is limited to twice the lowest modulating frequency of the input (voice) modulating signal, which for the given example is (2×300)=600 c.p.s. The output of the double balanced modulator is first applied to a high-pass filter 110 (210) which serves to heavily attenuate all frequency components below its cut-off frequency value of 2100 c.p.s. This stage is followed by low-pass filter 111 (211) having its cut-off frequency located at 5100 c.p.s. Thus the high pass filter serves to produce the initial sideband suppression at the lowest audio frequency value allowed, namely, the one-half spectrum band at the zero frequency axis, negative frequencies not physically in existence, being readily attenuated. The low-pass filter cutting off at 5100 c.p.s. serves to band limit this passed channel to its 3 kc. bandwidth. In conjunction, these filters form a pass-band or band limiting filter. No signal energy exists between the sideband limits of 1500 c.p.s. and 2100 c.p.s. and the high attenuation rate of the high pass filter from 2100 c.p.s. to lower frequencies adequately attenuates the lower sideband so that the output resultant energy only exists from 2100–5100 c.p.s. as indicated.

Now the selected spectrum band output of the band-pass combination of 110 and 111 (or 210 and 211) is between the frequency limits or 2100 c.p.s. and 5100 c.p.s. with the 3000 c.p.s. channel bandwidth being maintained and the lower side-band output of the double balanced modulated greatly attenuated. At this point, the passed sideband structure being as shown by 112 (or 212) has a new spectrum band center frequency value of $$f_{cbnew} = f_{lowupper} + \frac{1}{2}BW = (2100 \text{ c.p.s.} + 1500 \text{ c.p.s.})$$

or 3600 c.p.s. This new spectrum band of interest now becomes the modulating signal input to the double balanced modulator 113 (219 for channel II).

At this point, the full multi-channel ISB operation will be described, disregarding for the moment the switch position connections. Thus consider the system only in the normal (or neutral) position, and the relations of positions 1 and 2 will be delineated in sections on "Intermediate Quadrature Channel" operation. Note that channels III–A2 and IV–B2 are of like stage design and circuit arrangement as there shown in FIG. 1, with channel III designated by the 600 numerical series and channel IV denoted by the 800 numbered stages. Therefore, the description is made for channel III, and likewise applies to the channel IV item stages given within the enclosing parenthesis, as done earlier for the description of channels I and II.

For the outboard channel III (and IV), the circuits stages and arrangement numbered 602 through 611 (or 802 through 811, channel IV) are the like of the channel I stages of 102 through 111 (or channel II, 202 through 211). Their functional performance takes place in the similar manner as described above for the channel I (and channel II), and this equivalent operation need not be repeated for this newly disclosed addition. However, the further added stages of double balanced modulator 621, high pass filter 622, and low pass filter 623 of channel III (or 821, 822 and 823 for channel IV), that allow for modulation and also transmission as outboard channels, are connected and operated as follows.

The spectrum band passed at LPF 611 (or 811) is similar to that developing at LPF 111 (or 211) output, with A2 (or B2) being of differing information content illustrated by spectrum sketch 112 (or 212); and this passed band is fed as the modulating signal input to double balanced modulator 621 (or 821 in the case of channel IV). The carrier signal input for double balanced modulator (DBM) 621 (or 821) is supplied at a frequency value equal to the center frequency of the passed spectrum band output of LPF 611 (or 811), which for the band limits of 2100 c.p.s. to 5100 c.p.s. becomes (2100 c.p.s.+1500 c.p.s.)=3600 c.p.s.

This 3600 c.p.s. carrier frequency signal is obtained by the frequency doubling of the priorly used 1800 c.p.s.

carrier signal. Here the two times multiplication is shown being accomplished by frequency doubler 704 and supplied to the double balanced modulator's (DBM's) as required, where doubler 704 may be of the product multiplier type.

The doubler sideband output of DBM 621 (or 821) is of a like form as that of DBM 108 (or 208) where the LSB content location again takes place about zero frequency. But here the USB products encompass the region between (2100+3600)=5700 c.p.s. as the lower limit and (5100+3600)=8700 c.p.s. being the upper limit. The DBF 621 (821) output feeds to input of HPF 622 (or 822)—LPF 623 (or 823) cascade combination which, having a high pass cut-off frequency of 5700 c.p.s. and a low pass cut-off frequency of 8700 c.p.s., makes up a band pass region of 5700 to 8700 c.p.s. for 3000 c.p.s. bandwidth (BW). Only the sum frequency product output of DBM 621 (or 821) is passed and the difference product terms, 0 to 1500 c.p.s., are readily rejected. The 3000 c.p.s. BW spectrum band with a base-band center frequency value of 7200 c.p.s. is thereupon applied as the input modulating signal to balanced modulator 113 (or 213), which as already described earlier is also receiving channel I (or II) modulation signal inputs. At this point in the signal processing path, only a balanced modulator arrangement that secures cancellation of the carrier (or local oscillator) signal input is required. The appearance of the modulating signal input in the modulator output being fully eliminated by the sideband filtering action that takes place in this modulator's output. The double balanced modulators 113 and 213 are shown in preferred use for SSB receiver operation later described, and are of similar type. From this stage forward, the two channel pairs (I, III and II, IV) which had been similar, differ in that opposite sideband selections are made. In the illustrated example, channels I and III are made to locate themselves in the lower sideband output (LSB) of the transmission system while channels II and IV are set to use the upper sideband channel output (USB) of the transmitter with reference to the transmitter's operating carrier frequency to which it is to be tuned. Since like processing is associated with the modulation inputs to the pair of common IF modulators, 113 and 213, only channels I and II need be treated in detail.

OFFSET LOCAL OSCILLATOR—CARRIER SIGNAL GENERATION

Consider first the operation that concerns the development of the oppositely-offset local oscillator signals of the system for the multi-channel and the quadrature mode. The modulating input signal that is applied to double balanced modulator 113 is as shown in sketch 112. The local oscillator signal, 317, which is the carrier input to the double balanced modulator and the signal to which the modulator is balanced in order to attain proper suppression, lies above the carrier frequency value of the modulator section prior to subsequent frequency translation to the final specific carrier frequency value of the transmission system in the range of say 2–32 mc. Let 100K c.p.s. be used in this given example as the carrier frequency value of the modulator section output.

Now the 1800 c.p.s. carrier signal can directly be derived from audio reference oscillator 301 which, may be temperature controlled or compensated as by an encolsure with the conventional oven 300, and may well be of the crystal controlled type. Obviously insuring the required signal frequency (value of 1800 c.p.s.) use is to also be derived and continuously supplied from the frequency synthesizer proper, through established phase lock technique. For example, the reference 100 kc. standard frequency can be divided down 10:1 to 10 kc. by divider 501, and then the 10 kc. signal divided down 10:1 to 1 kc. using regenerative frequency divider 502. The 9 kc. signal internally generated within the regenerative feedback loop of frequency divider 502 is fed by separate path to a 5:1 divider 503 for the 1800 c.p.s. carrier signal, and by way of switch 504 applied to amplifier 302 to the balanced modulators. The 1800 c.p.s. oscillator signal is applied to tuned audio amplifier stages 302, which also serves as a buffer, amplifies the carrier signal up to the proper level for application to the double balanced modulators 108 and 208 over paths 303 and 304, respectively to serve as the described carrier frequency input to these modulators. A portion of amplifier 302's output is also applied to single balanced modulator 306 via signal path 305 as an input modulating signal. A second input to this modulator 306 is a carrier frequency input of 100 kc. supplied over path 408 from the synthetizer 404. The balanced modulator 306 output at 307 is as shown at 308 and consists of the suppressed carrier signal of 100 kc. and the sum and difference frequency products of the 1800 cycle input and 100 kc. carrier signal. Thus upper and lower sideband frequency components are developed where the upper sideband term is (100 kc.+1.8 kc.)=101.8 kc. and the lower sideband term (100 kc.−1.8 kc.)=98.2 kc. This double sideband output is simultaneously applied to circuit two paths 309 and 310. Signal path 309 leads to selective bandpass crystal filter 311 which has a center frequency value equal to the USB component frequency value of 101.8 kc. while signal path 310 leads to selective bandpass crystal filter 312 which has a center frequency value equal to the LSB component frequency value of 98.2 kc.

The 100 kc. carrier signal suppressed by the action of modulator 306 is further reduced or eliminated in the direct modulation process by the selectivity characteristics of the narrow-band-pass crystal filters 311 and 312 along with the respective undesired sideband component being applied.

Hence the output of filter 311 is the upper sideband component of 101.8 kc. (see 313), while the output of filter 312 is essentially the lower sideband component of 98.2 kc. (see 314). These signals are then applied to tuned local oscillator amplifiers 315 and 316, respectively, which are tuned to the frequency inputs of 101.8 kc. and 98.2 kc. respectively. These amplifiers are set to apply the proper carrier signal levels to the balanced modulators. It is recognized that double sideband generation results in the development of sideband signals of equal amplitude and coherent phase. However, since one of the tuned amplifiers, say sage 315, may well, by design, comprise a pair of gain stages; then the other tuned amplifier 316 may consist of a single or say an extra stage with the total amplification being set to an equal gain amount thereby giving the opposite phasing by way of the 180 degree phase reversal characteristic of the amplifiers used. Thus, local oscillator opposite frequency offset generation arrangement of the inventor's prior transmission system possesses much design flexibility. Furthermore an alternative approach using a phase shift technique is given in detail hereinafter with respect to the description of the embodiment of FIG. 4.

With slightly differing structure the lower local oscillator signal of 98.2K c.p.s. can also be directly derived by frequency synthesis with respect to the reference from the system's conventional frequency synthesizer. Accordingly, the available 3600 c.p.s. carrier signal and the generated 98.2K c.p.s. local oscillator signal may be applied to the inputs of a balanced modulator having a sum product selective filter in it's output. This produces the upper sum term of (98.2K c.p.s.+3600 c.p.s.)=101.8K c.p.s. as the other higher valued offset local oscillator signal.

The broadness of this communications approach will be more amply demonstrated with the embodiments of FIGS. 4 and 5 described further on, wherein a pair of basically differing alternative structures produce the required carrier generation.

System switches SS1 and SS2 are shown closed at position A to connect the audio outputs of channels III and IV to DBM 113 and 213, respectively, producing the four channel operation. When SS1 and 2 are set to position B, channels III and IV are disconnected from the pair of double balanced modulators 113 and 213. This representative removal of the two outboard channels illustrates the applicable two channel capability with but a pair of inboard channels in a quadrature select mode remaining therebetween for transmission and/or reception. Further beneficial refinements from dual channel operation only, are clarified in the FIG. 5 embodiment.

MULTI-CHANNEL SIDEBAND OUTPUTS

Consider now the double sideband output of the double balanced modulator 113 resulting from the product of its two input signals, the modulating input signal for channel I band of 2100 c.p.s. to 5100 c.p.s., centered about 3600 c.p.s. and the carrier local (101.8 kc.) oscillator signal 317. In accordance with conventional operation, the double sideband output has its sideband content located in a symmetrical manner about the actual carrier frequency value of 101.8 kc. being applied to the modulator. The sideband distribution as shown at 114 locates itself about the actual carrier local oscillator signal frequency value of 101.8 kc. such that the lower sideband content covers a region from 2100 c.p.s. to 5100 c.p.s. below 101.8 kc. or between the actual frequency values of 99.7 kc. and 96.7 kc. for the 3000 c.p.s. bandwidth of channel I. Similarly, the upper sideband channel II locates itself from 2100 c.p.s. to 5100 c.p.s. above the actual carrier frequency or from 103.9 kc. to 106.9 kc. covering the 3 kc. bandwidth. Again, it is to be noted that the minimum frequency separation between the sideband channels in the double sideband output of a balanced modulator is equal to twice the lowest modulating frequency value, where in the given example, this separation becomes (2×2100 c.p.s.) or 4200 c.p.s. It can be readily seen that the sideband channel separation of the double sideband output of the double balanced moduator 108 of 600 c.p.s. has now been advantageously increased to 4200 c.p.s. in the output of modulator 113. Of these relatively widely spaced sideband channels, the lower sideband channel is to be accordingly selected as the transmission channel path for channel I.

The valuable property of this spectrum separation produced by the widely spaced channels is well pointed out in the specifications of my aforementioned ISB transmission system. Now, a more than casual examination of the exploitable nature of this spectrum vacancy is dictated in that full attention to efficient spectrum utilization is universally recognized as necessarily demanded. It is of further technical merit that the exploration of a communications approach be such that exercises the presence of this band slot as a voice and data communications interface; thus producing an economic solution to equally demanding data communications problems. The challanging aspects of such formidable and diverse interests in the existance of the unoccupied channel directs perceptive search towards new principles of modulation systems; and a solution is advanced later on.

This 100 kc. location is shown at 114 and can be here referenced as the virtual or hypothetical carrier frequency. The required lower sideband selection for channel I is now achieved by applying the output of double balanced modulator 113 to lower sideband crystal filter 115 which is a standard 100 kc. asymmetrical sideband filter structure designed to suppress a 100 kc. carrier frequency and the sideband above 100 kc. and still readily pass frequencies 300 c.p.s. to 3300 c.p.s. below the 100 kc. value. Looking again to the modulator output of 114, it is to be noted that the existing lower sideband structure begins 2100 c.p.s. below the actual carrier frequency of 101.8 kc. which is at 99.7 kc. or 300 c.p.s. below the virtual or hypothetical carrier frequency value of 100 kc. Similarly at the other limit of the 3000 c.p.s. bandwidth, 5100 c.p.s. below 101.8 kc. or 96.7 kc. is thereby located 3300 c.p.s. below the virtual carrier of 100 kc. The standard 100 kc. lower sideband filter 115 normally set to produce 100 kc. carrier suppression also results in the suppression of the sideband component 300 c.p.s. above 100 kc. The asymmetrical selectivity characteristic of the filter with its sharp skirt attenuation from 300 c.p.s. below carrier to higher frequencies attains unsurpassed actual offset carrier and undersired sideband suppression. This 100 kc. sideband filter does not function to suppress the 100 kc. carrier frequency value of the modulator section, since this frequency component is not directly used in the modulation process. Since standard sideband crystal filters for 100 kc. have a steep side attenuation characteristic of 0.5 to 60 db from 300 c.p.s. away to the virtual carrier frequency of 100 kc., the actual carrier and unwanted sideband is further attenuated even allowing for the bounce back effects, that is, the decrease of out of band attenuation at frequencies further removed from the passband region, which is common with steep sided filters.

Thus the channel output of 100 kc. sideband filter 115, which is the bandpass region between 99.7 kc. and 96.7 kc. is then applied applied to the conventional linear summation mixing stage 401 for subsequent linear amplification frequency translation, power amplification and transmission in the 2–32 mcs. range, as the lower sideband of the transmitter operating carrier frequency value. In the illustrated example, the upper sideband channel of the system and the double balanced modulator 213 in the signal path of channel II has an actual carrier frequency value applied to it that is oppositely offset from 100 kc. by the same audio frequency amount as is being applied to modulator 113 of channel I. Whereas for channel I the actual carrier frequency used is above the reference carrier by 1800 c.p.s., for modulator 213 of channel II the actual carrier frequency 318 is 1800 c.p.s. below the reference carrier value of 100 kc. or 100 kc.−1.8 kc.=98.2 kc.

The double sideband output of modulator 213 as shown at 214 is applied to a standard 100 kc. sideband crystal filter 215 that is designed to pass the upper sideband content of the double sideband output of channel II. In this case, the upper sideband channel bandwidth between 100.3 kc. and 103.3 kc. is passed without attenuation, while the relatively remotely located lower sideband content between 93.1 kc. and 96.1 kc. and the already suppressed actual carrier frequency signal at 98.2 kc. are heavily attenuated and quite readily suppressed from appearing in the output of filter 215. Again the relatively widely spaced sideband location of the double sideband output of modulator 213 functions to optimize unwanted sideband suppression and further suppression of the already suppressed actual carrier frequency (98.2 kc.) signal. The passband output of filter 215, that is, the 3 kc. bandwidth between 100.3 kc. and 103.3 kc. is linearly combined with the lower sideband of channel I in the linear sum mixer 401. The resultant output of stage 401 is as shown at 402, where the LSB (BW of 3 kc.) for channel I and the USB (BW of 3 kc.) for channel 2 locate themselves symmetrically about the virtual or hypothetical carrier reference frequency value of the modulator section with the LSB channel appearing inverted. Now, again considering the channel III (or IV) band signal input of 5700 to 8700 c.p.s. to balanced modulator 113 (or 213), the difference and sum frequency product outputs develop with oppositely offset local oscillator signal of (100 kc.+1800 c.p.s.), (and 100 kc.−1800 c.p.s. for channel IV), I.F. bands of channel III–A2 and A2′ (and channel IV B2′ and B2). LSB crystal filter channel III 615 (or USB crystal filter channel IV 815) is placed in parallel with LSB crystal filter 115 (or with USB crystal filter 215).

For channel III, LSB crystal filter 615 has a passband of from (101.8−5.7) kc.=96.1 kc. to (101.8−8.7) kc.=93.1 kc. for a 3 kc. BW of 3900 to 6900 c.p.s. away from the virtual carrier frequency value of 100 kc. In the case of channel IV, USB crystal filter 815 provides a pass region of 103.9 kc. to 106.9 kc. The undesired sideband of A2′ for channel III (and B2′ for channel IV) is readily suppressed or removed from the carrier and the desired sideband; the frequency separation between the sidebands amounting to (twice 3900 c.p.s.) 7800 c.p.s. Hence in the present example, the like type standard asymmetrical crystal sideband filters are used where the LSB channel III crystal filter 615 (USB channel IV crystal filter 815) is of 96.5 kc. nominal carrier frequency (or of 103.6 kc. for channel IV) and passes only the region of lower sideband 96.1 kc. to 93.1 kc. (or of upper sideband 103.9 kc. to 106.9 kc. for channel I filter 815). The newly passed sideband filtered channel III (or channel IV) signal is applied along with the priorly described passage of channel I (or channel II) content to one input (or the other input for channels II and IV) of the linear sum combining stage 401. Accordingly at the output of the linear sum network 401, the prior channels of I–A1 and II–B1 of the basic transmission system show, appearing herein described (as in the referenced patent), along with the newly supplied channels of III–A2 and IV–B2 for this present invention.

TRANSMISSION SYSTEM OUTPUT

The method of carrier insertion is quite conventional and similar to the present technique of carrier reinsertion. The 100 kc. carrier injection signal is supplied from the 100 kc. master oscillator frequency standard of the transmission systems frequency synthesizer contained within the synthesizer controlled frequency translation section 404. Besides being internally supplied in the conventional and well-known manner of synthesis operation for the generation of the range of selectable equally stable frequencies required in the frequency translation, being converted IF to RF in transmission and in reception as a RF to IF conversion process accomplished by section 404, the 100 kc. standard frequency signal output 407 is also applied over two other paths, 409 and 408.

The 100 kc. IF amplifier stages 403, the synthesizer controlled frequency translation section 404, the intermediate power amplifier and final linear power amplifier and antenna coupling stages 405 and associated antenna 406, are all common to the four sideband signals with bandpass regions greater than 20 kc. to complete the transmission or reception path of a receiver/transmitter system.

These common path stages and sections are well known in the communications art and their application in the manner shown is conventional and of standard practice in covering the high frequency band of 2–32 mcs.

The communications system thus described achieves the ISB transmission standards for spectrum conservation and full channel utilization. With the alloted sideband channel spacing of 600 c.p.s., that is, 300 c.p.s. above and below the final transmitter carrier frequency, the system produces proper independent sideband multi-channel transmission of pairs of upper and lower 3 kc. s. bandwidth channel, comprising four differing signal information content bands in a simultaneous manner.

For Asychronous Single Sideband (ASSB) transmission, the described system requires merely the adding of a carrier component to its emission. The necessary carrier level amplitude is adjusted as shown by potentiometer 410 after the closure of switch 409. For independent sideband operation switch 409 remains open.

The other separate path of the 100 kc. standard frequency signal, which may be isolated, leads by way of 408 to carrier input of single balanced modulator 306. As is noted from the operation description given in the earlier paragraphs, the manner of the actual carrier signal frequencies generated and applied in the sideband modulation process of the modulator section is attained with phase coherence.

The connecting path between frequency translation section 404 and the drive and final linear HF power amplifier 405 is, as shown, made by way of T position closed contacts of the receive-transmit switch 412. In T position, antenna 406 connects directly to the RF-IF translation section 404 by contact of R–T switch 412. The relay actuation between the receive-transmit position of switch 412 is made for normal transceiver operation control in the conventional manner by typical voice operated switch 413 commonly designated VOX.

A more descriptive explanation of a more novel voice controllable operation will be given further on in the section concerned with the discussion of FIG. 3.

The illustration of VOX 413 of FIG. 1 connected at the RF output is not herein intended to relate to multichannel operation but merely representative of one mode transceiver control for single channel operation, and other variations of this action are known to the art. More particularly, transceiver action is then primarily concerned with channel II bi-directional transmit-receive operation in the novel intermediate Quadruture Modulation mode; or as a selectable alternative, transmission is made on channel I and reception is obtained via Quadrature channel II. Later paragraphs will discuss such operation.

Communications often concern other than analogue voice, examples being printed messages over long distance, along with frequency shift keyed radioteletype (FSK), and like digital techniques. For high frequency communications, recognized frequency diversity or other diversity techniques may be used to minimize short term or long term effects of multi-path experienced in the transmission medium. A more recent technique of greater message reliability is based on a method termed Quantized Frequency Modulation (QFM) and designated by the Military Services as the "Long Arm" system. The general application of a digital frequency converter is described in "New System Defeats Multipath Effect" by George A. Scheer, Wright Air Development Div., ARDC, Dayton, Ohio, a technical paper published in "Electronic Industries" May 1960 pp. 150–153, 156. Clearly, the side stepping RF translator described in the implementation of this technique may be readily added to the terminal exciter equipment associated with basically new modulation method of this invention; without any change but the replacing of conventional IF-RF frequency translator section 404 and with the application of the LONG ARM converter made prior to the linear power amplifier 405.

TYPICAL MULTI-CHANNEL ISB OPERATION.—FIG. 2

Having described the elements of the multi-channel ISB operation that is obtained by the added stages mentioned earlier, it is best at this point to refer to FIG. 2 for example spectrum band sketches that represent the sequence of sideband structure locations to explain such typical operation. The total multi-channel system bandwidth encompasses four 3000 c.p.s. BW channels with 600 c.p.s. separation between the adjacent channels or four times 3000+three times 600=13,800 c.p.s., which say allowing 600 c.p.s. band guard between transmission systems, gives an overall total of 15K c.p.s.

Let $f$ virtual carrier be the common IF and thereafter further translated to be the transmission system station output frequency.

Observe sketch [1] which is an example two channel operation obtained by the basic shell transmission system of reference Pat. No. 3,217,256. Channel sketch [2] exhibits the advancement of [1] to a four channel operation. This performance is obtained with the Mode Select Switch in the normal or off position as earlier described.

Spectrum band sketches [3] and [4] illustrate the flexibility of the invented communications system derived from its quadrature select mode operation that is explained in greater detail in the remaining paragraphs of this specification. As may be noted from prior sketches [1] and [2], an unoccupied channel band slot is available prior to the combination and summation of the respective outputs of common (and double) balanced modulators 113 and 213. It is this vacant band space that is filled by the intermediate quadrature select mode operation, where [3] represents the herein exampled position 2 case with the use of channel II band location; while [4] covers the position 1 selection of the channel I bandwidth and at which inverted speech operation may be obtained. In essence, similar operation is brought about in either position 1 or 2, and the exampled mode position 2 for channel II quadrature selection is detailed herein.

Note by sketch [3] that the band slot of modulator 113 output is filled with quadratured information, while the prior B1 sideband filtered information of channel II is thereby omitted and replaced by the translated inboard quadrature output of balanced modulator 213. Thereafter upon summation, channel II is the sideband information output that, by way of intermediate quadrature modulation and symmetrical filter selection, is free of asymmetrical sideband filtering limitations. A like operation occurs for sketch [4].

As symbolically shown, the desired transposed inboard quadrature sideband substitutes for B1-channel II at position 2 (A1-channel I of position 1), while the other undesired quadrature sideband output of the modulator 213 (113 at position 1) locates at the formerly B1′ (position 1–A1′) occupied band and is subsequently suppressed from appearing in the transmission output. The manner by which the undesired sideband content is rejected, and the filled USB quadrature sideband is readily combined with the transposed substituted quadrature sideband into the independent sideband channel II, is detailed in the following section with the continuation of the FIG. 1 embodiment description.

FIG. 1.—INTERMEDIATE QUADRATURE CHANNEL OPERATION (700 NUMBERED SERIES)

Referring again to FIG. 1, it now remains to describe the functional operation of the quadrature select mode ISB inboard channel action, where the intermediate quadrature channel (IQC) 700 series items may be switched to perform with either channel I or channel II stages wherein the added circuit stages comprise double balanced modulator 701, phase shift network 703, frequency doubler 704, phase shifter 705, and double balanced modulator 706. These stages representing IQC 700 along with low pass filter 700*a* constitute the newly introduced stages to the audio modulation section, and in association with the in-common use stages and the designated 700 series numbered stages in the IF modulation output, formulate the selectable intermediate quadrature modulation operational mode of this present communications system.

The following description is given for mode select switch position 2, while the item stages numerically designated within the parenthesis thereupon refer to the stage that would be in use in the case of position 1. In accordance with the descriptive operation already given, it is understood that the channels III and IV, along with channel I for position 2 (or channel II for position 1 as per parenthesis) remain independently generated and supplied at the same time. A simple mode select switch operation, where a series of three position single wiper or one pole-triple throw switch, designated SW1 thru SW11, may be VOX controlled in being mechanically ganged for a simultaneous position change throughout the system. The normal center or neutral or off position of mode select sw. allows for unchanged four channel operation in the manner previously described. Thus, the advancement of intermediate quadrature as a novel method of modulation being implemented by the intermediate quadrature channel operation is observed to be judiciously disposed to the earlier described MC–ISB Communications System as the functionally optimized complement thereof. Accordingly, for channel II (or channel I) quadrature, the audio input of B1 (or A1), as obtained at the output of audio output amplifier 206 (or 106) now also connects to the wiper of mode select switch SW1 section. Thus it feeds to the IQC 700 double balanced modulator 701 input via position 2 (or 1) of mode select switch SW1 (while remaining as the input to double balanced modulator 208 (or 108)). The $f_{c.o.1}$=1800 c.p.s. carrier signal remains applied to the double balanced modulators 208 and 108, but herein is also being fed to inputs of 90 degree phase shifter 703 and frequency doubler 704; in addition to serving as the 1800 c.p.s. carrier signal for channels III and IV.

After undergoing a 90 degree phase shift, the 1800 c.p.s. carrier signal output of phase shifter 702 becomes the carrier input to double balanced modulator 701. The double sidebands resulting in the outputs of double balanced modulator 701 and 208 (or 108) remain as earlier prepresented by spectrum sketched band 209 (or 109) where now the respective modulator outputs are in quadrature or 90 degrees out of phase with respect to each other. Low pass filter 703, connected to the output of DBM 701, has its cut-off frequency set to readily attenuate signal frequency components above 1500 c.p.s., and thus passes unattenuated the folded over lower sideband content from 0 to 1500 c.p.s. In channel II (or I) the double balanced modulator (DBM), 208 (or 108) output connects to the input of low pass filter 700*a* via position 2 (or 1) of mode select SW5; whereby only its lower sideband products of 0 to 1500 c.p.s. is allowed to pass at LPF 700*a* output; this path being denoted as the direct quadrature path.

Note here that the audio input spectrum is being modulated with two in-band carrier signals of a frequency equal to the arithmetic center of the audio band and the carriers are differing by 90 degrees in phase. Hence as a result, like audio components at the outputs of double balanced modulator 208 (or 108) and 701 are also shifted in phase by 90°. With first quadrature operation, the sequencing property of the input band of signals becomes important, that is, the phase of the signal response is dependent upon whether the frequency is numerically above or below the carrier frequency it modulates. In order for each component of the folded over input band output result of one LPF to be in quadrature with its corresponding component from the intermediate quadrature channel LPF output, the frequency-phase characteristic of the paths need to be the same; and LPH 700*a* and LPF 703 are made identical. Since the separation between the carrier frequency and the highest modulating frequency is small, low pass filter construction for equal frequency-phase characteristic presents no particular design problem in present filter art where a smooth delay characteristic of phase change as a function of frequency is obtainable in the audio region.

In general, prior art filter and phasing techniques for SSB generation and reception in voice communications direct little attention to phase or time delay distortion effects on the modulating signal envelope. However, where it is desired to transmit signal waveforms that do not tolerate phase distortion, the filter delay characteristics need to be compensated. To accomplish data type signal processing, constant time delay filters are necessary. Experience shows that asymmetrical sideband filters of either crystal or mechanical resonator type naturally encompass complex electro-mechanical coupling energy modes; which therefore becomes most difficult to realize as being of constant time delay. Note is to be made that the secondary effects of crystal filters are recognized as limiting, and the present art has available various synthesis techniques allowing for the ready design of passive low and/or high pass constant delay filters in the audio range. With this knowledge in mind, it becomes clear that a desirable operational advantage is secured over the classical single sideband filter method by the further introduction of a phasing cancel technique via intermediate quadrature functions. One utilizes an existing channel vacancy or band slot for such type modulation availability as selected and thus avoids the phase distortion effects of asymmetric filters.

In typical applications, the low pass filters of maximally flat magnitude and equal ripple type response may be cascaded with all pass network; with such combination producing linear phase response and thus constant time delay.

The two quadratured LPF outputs are then passed to two separate additional product modulators; whereby with mode select SW6 in position 2 (or 1), the LPF 700*a* output feeds to the input of common balanced (double) modulator 113 (or 213) and LPF 703 output is applied as signal input to double balanced modulator 706.

Returning for the moment to the 1800 c.p.s. carrier signal input to frequency doubler 704, recall that the output of doubler 704 is further supplied as the 3600 c.p.s. carrier signal input for channels III and IV as earlier described.

The frequency doubled signal of 3600 c.p.s. is phase shifted by 90 degrees upon passage through phase shifter 705 and is applied to double balanced modulator 706 as the carrier signal. This second quadrature modulated output results in an unfolding of the modulating signal input of 0 to 1500 c.p.s. about the carrier signal frequency location of 3600 c.p.s. Hence DBM 706 double sideband modulation due to 0 to 1500 c.p.s. information forms a band of signal content between (3600−1500)=2100 c.p.s. and (3600+1500)=5100 c.p.s. With the selection of intermediate quadrature modulation mode of an inboard channel, the prior sideband filter operation for the selected channel is removed therefrom. Thereby with the illustrated switching arrangement of position 2 (or 1) of SW2 and SW3 (or SW4) then the common usage of high pass filter 210 (or 110) and low pass filter 211 (or 111) combination is obtained by its connection to the DBM 706 output. Being of linear phase-frequency design this bandpass combination has a bandwidth extending from 2100 c.p.s. to 5100 c.p.s. and the sole sideband output of double balanced modulator 706 readily passes therethrough without attention. The intermediate quadrature operation is thereby completed with audio phase shifting.

With the second phase quadrature modulation having been made, this band of signals then becomes the modulating signal input to the common channel double balanced modulator 213 (or 113). The original channel II (or I) speech content band translated modulation input for these frequencies as earlier stated is not used, and this has been omitted by the mode select SW section SW3 (or SW4), providing thereat the required channel vacancy or band slot. Use is now made of the fact that the heterodyne action of the final pair of modulator stages as properly carried out changes frequency but preserves the phase relations, and this translation is achieved by having the two heterodyne local oscillator voltages of coherent phase. The generated two local oscillator signals, oppositely offset with one at 101.8 kc. and the other at 98.2 kc. (for 3600 ΔF as earlier described) are coherent with long time frequency stability equal to that of the 100 kc. ultrastable oscillator standard of the system and can be made to exhibit a differential time jitter relative to each other of less than 0.1 μsec. RMS. Whereas a 3600 c.p.s. (ΔF) numerical frequency difference exists, phase-wise the supplied signals are synthetically produced from a single source and related therewith.

Recalling that the zero phase referenced 0 to 1500 c.p.s. spectrum band passed output of LPF 700*a* via mode switch SW6 position 2 (or 1) is the modulating signal input to double balanced modulator 113 (or 213), note that the local oscillator signal is, in this example embodiment, at (100 kc.+1800 c.p.s.)=101.8 kc. [or (100 kc.−1800 c.p.s.)]=98.2 kc.

The direct supplying of the one-halved bandwidth, (0–1500 c.p.s.) modulated signal input to common double balanced modulator 113 (or 213) promotes itself as most conducive to attaining fulfillment of the band slot at channel I (or II) spectrum space existent in the modulator output with optimized compatibility. By initiating such purposeful action, the singular modulator 113 (or 213) capacity supports the simultaneous handling of three differing bandwidths with an isolation therebetween. An added value acquired therefrom becomes more apparent as pointed out later on; whereby, with a channel gain ratio control procedure for the signal processing paths of the two differing mode inboard channels, the development of undesired sideband content is further diminished.

Accordingly, a like modulation process occures such as earlier described for the 3600 c.p.s. carrier signal to double balanced modulator 706, where here the resulting unfolding takes place at an IF about the mid-frequency location of 101.8 kc. (or 98.2 kc.). This quadrature spectrum content thereby occupies the vacant band slot (see FIG. 2, sketch 3) between channels I and III (or between channels II and IV for position 1 of mode select SW), and passes without attenuation through bandpass filter 715*b* (or 715*a*); with such filter being of symmetrical design.

Simultaneously, the output of the second phase intermediate quadrature operation of 1800 phase referenced (2100–5100 c.p.s.) spectrum band passed at the output of HPF 210 (or 110) and LPF 211 (or 111) cascade combination is the modulating signal input to balanced modulator 213 (or 113) and the local oscillator signal to this modulator is at 98.2 kc. for channels II and IV, (or for channel I and III at 101.8 kc.). Sum and difference frequency products result, whereby the lower sideband and the upper sideband terms substitute in the occupation of the priorly described channel II B1′ and B1 bands [(or channel 1 A1′ bands). See FIG. 2 sketch 3]. Only the B1 channel II (or A1 channel I) spectrum band passes unattenuated through channel I and channel II bandpass filter 715*a* (715*b*), while the undesired sideband content of B1′ (or A1′) is readily rejected. Mode select switch SW9 (or SW8), connected in the output of USB crystal filter 215 (or LSB crystal filter 115), disengages the channel II (or channel I) asymmetrical filter when in position 2 (or 1).

From the deficiency discussions as indicated earlier, the asymmetrical sideband filter design allows no emphasis to be made on its phase linearity, where phase non-linearity is most severe at near the band edges. To secure the proper sideband recombination and undesired sideband rejection on a phase related basis, the bandpass filter channels I and II 715*a*, like the identical bandpass filter 715*b*, is symmetrically used having a center frequency value equal to the virtual carrier frequency and set to be of flat bandwidth that allows encompassing twice that of the band signal to be combined, that is, conjunctively band passing channel I and channel II. This passage is done to minimize the distortion because the phase non-linearity of a bandpass filter, such as a two-pole, 6–60 db attenuation bandwidth ratio of three or less Butterworth filter, is at the band edge; and is proportional to both the time delay variation in the filter and the modulation frequency. In either case the higher input modulating frequencies appear at the band edges and the more energy pronounced lower frequency tones then remain preserved.

Envelope delay is noted a more restrictive factor towords waveform distortion development since the non-uniform phase characteristic of a network materially increases before the relative attenuation slope does.

Accordingly, the channel II (or I) passed output of bandpass filters 715*b* (or 715*a*) connects to position 2 (or 1) contact of mode switch select SW6 and also to position 1 (or 2) contact of mode select switch SW7. Likewise, the channel II (or I) passed output of bandpass filter 715*a* (or 715*b*) connects to position 1 (or 2) contact of SW6 and also to position 2 (or 1) contact of mode switch SW7. The pole of mode select-switch SW6 connects position 2 (or 1) to amplitude equalization and time delay compensation network, AE and TDC 716.

The unfolded translated information about the location ($f_c$+1800 c.p.s.) or 101.8 kc. is passed through AE and TDC network 716, which may comprise conventional filter sections that duplicate the amount of the envelope group delay introduced for the modulating signals passage through the intermediate quadrature channel 700 by the HPF 210 (or 110) and LPF 211 (or 111) bandpass combination and equals the signal energy loss. This network 716 delay factor, when coupled with the group delay of the bandpass filter type cascade combination in the IQC path equalizes the time delay for the linearized phase shape characteristics of the two channels, and waveforms are preserved thereby.

At the 100K c.p.s. region, a microsecond delay amounts to a 36 degree phase shift compensation. The direct quadrature and the intermediate quadrature translated signal path have travelled through like stages except for the second quadrature operation of the "IQM" process. Since the BPF combination of HPF–LPF 210 and 211 is at audio range and of linear phase design, the time delay is a fixed amount that is balanced by a like delay time insertion with the other channel. The delay and loss compensated channel, channel II (or I) output from amplitude equalization and time delay compensation network 716 feeds to one input of linear sum network 717. The wiper of mode select switch SW7 connects to position 2 (or 1) and channel II (or I) to the other input of linear sum network 717.

The quadrature relationship between the two summed sidebands are then such that the undesired sideband content is cancelled while the wanted sideband information is additively reinforced. Thereby, only the desired channel II (or I) SSB sideband results at the linear sum network 717 output, along with the undesired channel I (or channel II) content which remains unaffected. The summed result is then applied to channel II bandpass filter 718 (or channel I bandpass filter 719) by way of position 2 (or 1) of mode select SW10. Further suppression of undesired channel I (or channel II) can be here accomplished as will be pointed out later on.

The single channel II (or I) that has been brought about by way of the quadrature modulation process described in the paragraphs above results at the output of channel II (or I) bandpass filter 718 (or 719) and, with T–R switch 720 in position T, becomes one input to linear sum network combiner 721. The other input to combiner 721 is obtained from the output of linear sum combining network 401. The combined linear sum network 721 output connects via position 2 (or 1) of mode switch SW11 to the common IF amplifier 403 input, and consists of the channels I, II, III, and IV, where channel II (or I) is the described quadrature selected one by way of position 2 (or 1) of the mode select switch.

It is understood that the placing of T–R switch 720 into receiver position is conventionally accompanied by replacement of say a microphone input at the audio center 100 by say an audio speaker output. In the case of data handling, differing input-output terminal devices are in use, such being known in the art.

Three bandpass region of BPF 719 for channel I and BPF 718 for channel II, along with the succeeding common bandpassing of the IF–RF output stages are noted to be symmetrical; and of sufficiently wide bandwidth such that the used band portion about the central frequency exhibits a linear phase-frequency characteristic. The remaining transmission operation follows the earlier given description of the common path IF–RF channel stages of FIG. 1.

Such bandpass filter design approaches can be found summarized in the technical publication, "Linear-Slope Delay Filters for Compression," by T. R. O'Meara, on pages 1916–1918, in vol 48, November 1960, Proceedings of the IRE.

As an interesting result, it is recognized in the practice of the asymmetrical crystal filter method of sideband generation that the selective phase delay and distortion for the USB content does not correlate with that developed in the LSB channel. Observe hereat that use of a like pair of symmetrical bandpass filters with two channel bandwidth along with having amplitude equalization and time delay compensation made for the presence of either one of the selected channels insures a high degree of linear phase correlation regardless of which channel is put into use.

For convenience, the data information signal input from the audio center 100 is generally shown following the voice band input channel path of stages in sections 102 or 202. However, the "IQM" data link technique is in proper use where a separate data input path of linear phase versus frequency characteristic is supplied, or the channel sections 102 and 202 are designed to exhibit constant time delay.

SYMBOLIC SIGNAL PROCESSING-MULTI-PLEX FIG. 3

Figure 3:
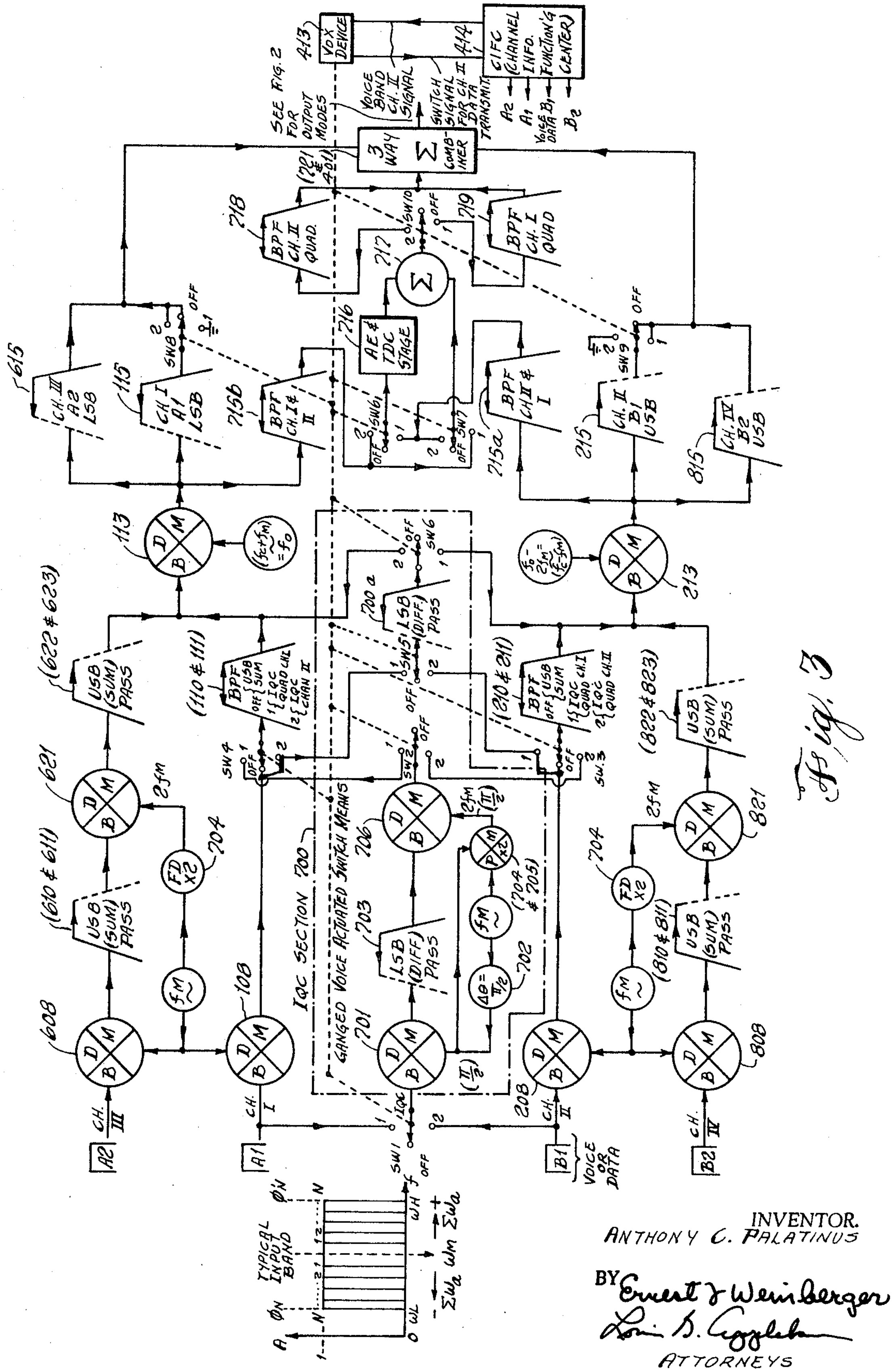
FIG. 3 represent a symbolic frequency schematic illustrating the essential elements of the quadrature select, multi-channel ISB excitation of this communications system invention.

Observe now in FIG. 3, wherein for clarification of the signal process in the multi-channel, quadrature select excitation operation is presented in a symbolic frequency schematic arrangement from which the functional purpose is best understood. Simplification is made of the carrier signal generation and HPF–LPF bandpass filter combinations, with the signal sources of $f_m$, ($f_c$+$f_m$) and ($f_c$−$f_m$) without numeral designations. The HPF–LPF combinations point out the product term processed and the filter characteristics most appropriately indicates the type and frequency pass direction.

In this respect, the arrowed direction of the flat response portion of the amplitude response characteristic designates the sideband chosen, whereby directed to the right denotes upper sideband or sum product passage and pointed towards the left gives passing of lower sideband or difference product terms. The bandpass filter (BPF) process has both arrowed directions illustrated, as would be expected of combinational HPF–LPF arrangements.

In the circuits arrangement illustrated in FIG. 1, the bandpass combination is shown as being of lower cut-off frequency high pass filter in cascade with higher cut-off frequency low pass filter, and at times these may be considered rearrangeable networks. Hence, the low pass unit may precede the high pass unit in a practical embodiment, which may be the desired practice in the case of bidirectional operation. The typcial input band sketch of FIG. 3 introduces a new concept in its representation and the full value of this analysis exercise will be demonstrated with the description of FIG. 4.

The crossed circles by convention depict the product modulation operations, and the other circled stages designate frequency doubling or multiplication, 90° phase shift, summation and frequency generation as marked.

Figure 2:
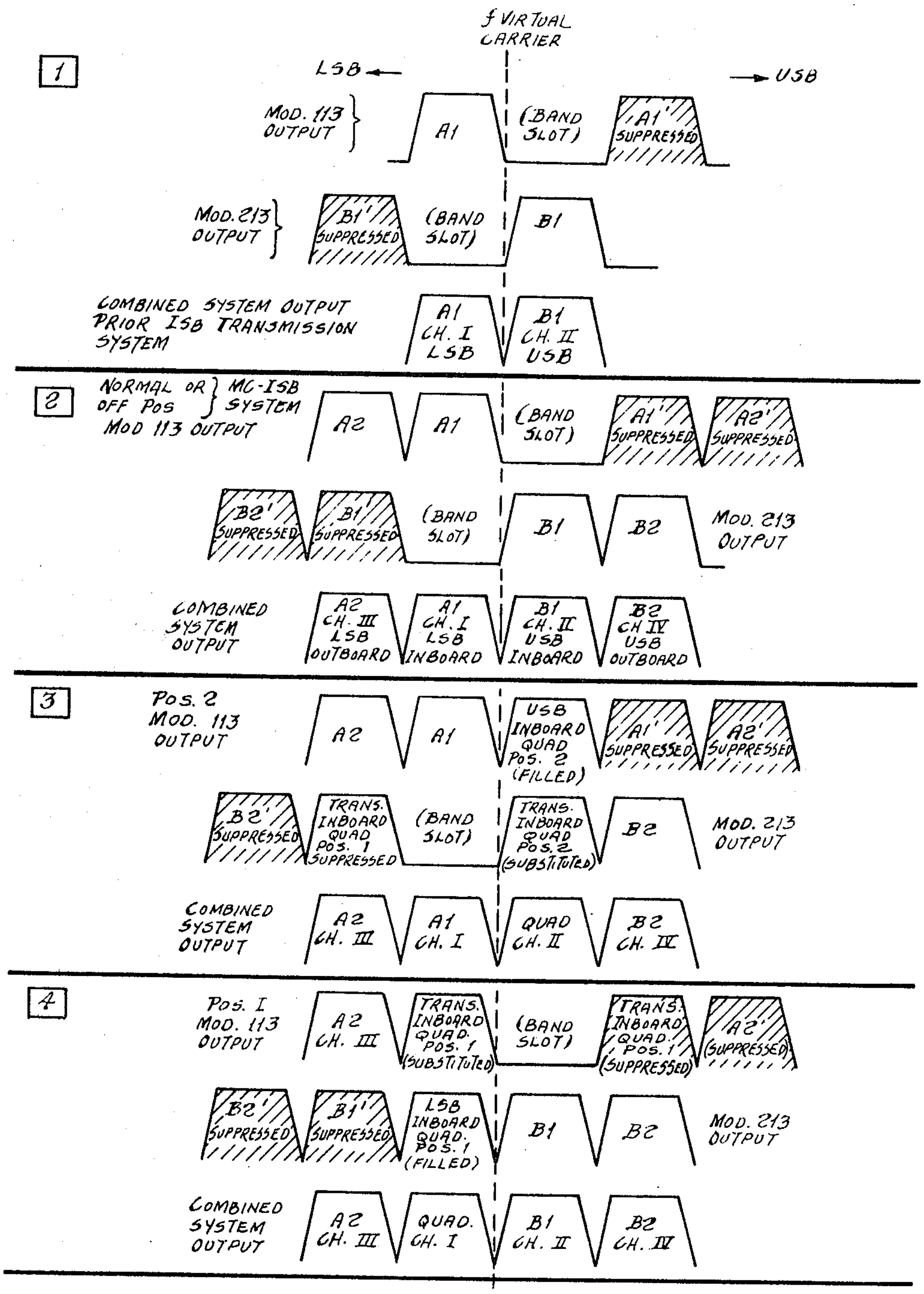
FIG. 2 is a functional spectrum sketch representation of the communication system transmission sideband distribution structure modes illustrating typical quadrature select, multi-channel ISB operation as accomplished in accordance with the principles of this invention.

In view of the detailed and overall description given of FIGS. 1*a* and 1*b*, along with the operational mode elements of FIG. 2, this symbolic representation of FIG. 3 becomes self-explanatory. The product modulation operation by way of PMX2 stage (704 and 705) is further discussed in the signal analysis made for the circuits arrangement of FIG. 4.

The method of intermediate quadrature modulation (IQM) within the multi-channel Communications System is so far described in a preferred embodiment. However, this new modulation technique may be further instrumented using substantially differing circuit apparatus. Observe that in another design, the relatively fixed delay requirement may be satisfied by equalization at audio frequency between the output of Low Pass Filter 700*a* and the wiper of mode switch 6. This is illustrated in the FIG. 5 embodiment. Here, the amplitude equalization and time delay compensation (AE and TDC) stage operation takes place in the audio range. This is made possible based on the symmetrical characteristics of band pass filters, and reference is made to the LPF–BPF analogy, given in the textbook "Pulses and Transient in Communications Circuits" by Dr. Colin Cherry, page 121, published 1950 by Dover Publication, Inc.

From the explanation given therein, the characteristic of a BPF is noted as being of a more exact or having high degree of symmetry about its central frequency as the ratio of bandwidth to mid-band frequency becomes smaller ($BW/f_{MID}$). It should be appreciated that by way of LPF–BPF analogy, all low pass filters may be regarded as bandpass filters with zero frequency mid-band ($W_o=0$) and their characteristics considered in conjugate form exhibit symmetry about zero frequency (DC).

As illustrated in the embodiment of FIG. 1, outboard channels III and IV are transposed to the 5.7 kc.–8.7 kc. modulation band by way of a double modulation process that makes use of the already existing 1800 c.p.s. and 3600 c.p.s. carrier frequency signals. However, in an alternative embodiment, channel III stages 608, 610 and 611 (808, 810 and 811 for channel IV) may be omitted, and a frequency tripler used to multiply the 1800 c.p.s. signal to become the 5400 c.p.s. carrier signal input to DBM 621 (or DBM 821 for channel IV), this action directly transposes the 300 to 3300 c.p.s. band input to the 5.7 kc.–8.7 kc. band; and while fewer stages are in use, a greater degree of selectivity is required of the HPF 622–LPF 623 band pass filter arrangement (HPF 822–LPF 823 of channel IV). Also, a frequency tripler tends to be more complex in nature. For a further example, the IQC 700 section of FIG. 1 shows the separate frequency doubler 704 and 90° phase shifter 705 for the quadrature generation of the 3600 c.p.s. carrier signal; a single product multiplier may preferably be used. In this case, the sin $W_mt$ output of 90° phase shift network 702 is applied as one input to the product multiplier, which may be a Hall-effect Multiplier. The original cos $W_mt$ input to phase shifter 702 is also applied as the other input to the product multiplier. Frequency doubling occurs in the product multiplier output, with simple filtering giving (sin $2W_mt$), since (sin $W_mt$)(cos $W_mt$)=(½) sin $2W_mt$ by trigonometric identity; and suitable amplifier gain inserted therein produces unity amplitude.

As a second example, to illustrate the wide range virtual carrier frequency value selection possible within the basic ISB transmission system as for example, from the former 100K c.p.s. value to say a 1.75 mcs. IF, a conventional phase shift method of two frequency coherent signal generation is used. Stages numbered 900–908 of FIG. 4 demonstrate this operation; and comprising 45° phase shifters 901, 902, 903 and 904, balanced modulator pair 905 and 906, and the sum and difference combiners 908 and 907 respectively. The oppositely offset local oscillator signal generation takes place in the following elementary manner. Each of the two reference signals, the audio carrier signal and the common IF carrier signal are each divided and phase shifted ±45°. Accordingly, a constant 90° phase difference is maintained such that the two audio input signals to the pair of modulators are in quadrature and the two carrier signals of the modulator pair are also in quadrature with respect to each other. The balanced modulator pair 905 and 906 have their outputs of the double sideband, suppressed carrier type. The relative phases of the resulting sidebands are such that, with linear summation one sideband is cancelled and the other sideband is reinforced. In the case of subtraction in a linear difference circuit, the situation is reversed. Hence, sum and difference frequencies that are coherent but isolated from each other are generated.

Consider further that in some design cases, particularly at the high common carrier frequency values of say 1.75 mcs., it becomes increasingly difficult to then remove to a great extent the unwanted sideband content of unused band A1–LSB modulation. In such an application, a pair of bandstop filters, along with the band pass filters 715a and 715b, may best be employed in an alternate manner according to the quadrature channel selection made. In general, this usually would not be required as the phase shift method of local oscillator generation given later on in FIG. 4 is most suitable for high common carrier values, where modulation with both filter type or both quadrature channel operation is implemented.

VOICE DATA OPERATIONAL PROGRAM

In FIG. 3, by schematic representation, the series of single pole, three position switches, SW1 through SW10, are shown by broken line connection to be ganged for simultaneous operation by way of voice actuated electronic means such as the voice operated switch 413 of FIG. 1. At this point, it is best to examine the natural functioning that distinctly reveals itself within the channel plurality framework of this disclosed method of communication and manifests the scope identified with the making available of this instant invention.

Design considerations for VOX 413 stages in transceivers are known to the art, and a recent technical paper, "Neons Control VOX Circuits" by T. Bially, published in Electronic Design, July 1966 issue on pages 68 and 69 adequately describes a typical design of such stages.

VOX 413 is further shown connected to what is suitably designated a Channel Information Functioning Center, CIFC 414, and such a combination may coact in an automatic manner. Besides encompassing the earlier described audio control center 100, the Functioning Center 414, much like prior art data processing centers, also comprises a terminal equipment complex that likewise serves in controlling other associated communications operation as is known in the art; but further performs a novel programmed action now to be described. In addition to the receive-transmit antenna control practice being like that of FIG. 1, which also can be conventionally done at audio range, such function processing apparatus consists of voice/data recorders, storage/delay units, playback devices, and line input-output monitor and reproducing terminations; examples being teletype units, mikes and speakers, and the like.

The objectivity of VOX 412 and CIFC 414 as they coact for a meaningful new principle of modulation given herein is readily understood from the following description of a control automated technique that characterizes this communications method. Therefore, the CIFC 414 section functions in providing facilities in the logic supervisory control and command programming of the electrical signal characteristics for the data and voice terminal communiactions equipment interface.

Present tactical voice usage is mainly the familiar netted operation of a number of radio sets on a common assigned frequency with "push-to-talk" carrier control by microphone button switch. Double-sideband radio duplex operation, in which both parties to a radio conversation can break in on each other almost at will, requires a separate frequency assignment for each direction of voice traffic, and precludes any break-in netted operation of sets. A quasi-duplex SSB radio set operation is obtained by having the system in a quiescent or in rest at the receiving condition, and as soon as the operator talks, a voice-operated control such as SW 413 of FIG. 1 automatically switches the radio set to the transmitting condition. At moments when the speaker pauses for breath, or between words, the set ceases to transmit and automatically reverts to the at rest receiving condition. Hence, once proper station frequency is attained, any number of sets may converse in this manner which greatly expedites the handling of voice traffic. Here there is the long required accompanying need to provide the yet to be achieved duplex operation for other than voice information, like say data communications, either singularly or on a combinational basis. This problem and the limitations it imposes is overcome by the herein devised method of duo-modulation, wherein a voice channel and a data channel of intermediate quadrature function operation may be made bi-directional for transceiver performance. Also in effect, a single 3K c.p.s. communications bandwidth may have voice and data channels alternately combined and likewise be transmission conditioned for the specific mode in operation. The unique Intermediate Quadrature Function Modulation technique, as introduced herein, allows bi-directional transceiver performance, with common RF modulator stages. The high degree of flexibility provides for the selection of the type modulation mode in agreement with the signal nature of the information content; thereby insuring more reliable and effective message transmission and handling. By way of this invention, full spectrum utilization for voiced communications is attained, particularly for long haul operations; and valuable data transmission channels is suitably obtained from the same communications system in a selectable electronic manner through switch use of a voice-operated electronic switch (VOX) 413 arrangement.

Formulation of the total impact and full value attainable from the intermediate quadrature select, multi-channel ISB transmission system invention is thus realized with the implementation of applicable time-multi-plex methods. Observe from the well known engineering studies made by International Telephone and Telegraph Company (ITT) resulting in their "Automatic Alternate Voice/Data" system, and Bell Telephone Laboratories (BTL) in their "Time Assignment Speech Interpolation" (TASI) system each differently utilizing the time intervals in voice channels resulting from the pauses and silences in normal conversation. In ordinary conversation, voice signals are known to be present only approximately 36% of the time, with the remaining 64% interval being dead time. Silence between speakers accounts for say but 48% of total transmission time with the normal speech pauses comprising a 16% portion.

In order to further comprehend the forthcoming descriptive process of the functional operation acquired by this new method of communications, a brief digression into the prior art background of such time allotted speech controlling systems is considered useful.

Operating in the fourth dimension as a "time saver," the Bell Laboratories TASI System connects a "talker" to an available transmission channel for the duration of a "talkspurt," that is, a pause interval between speech phrases and syllables, rather than for the duration of a whole spoken conversation. Ample detail of this technique is given in the Bell System Technical Journal, vol. XLI, Issue No. 4, July 1962, in the paper "Overall Characteristics of a TASI System," by J. Fraser, D. Bullock, and N. Long, on pages 1439–1454.

The speech detector and common control of the TASI systems correspond closely to a voice operated switch (VOX) and information storage combination. Of course in a complex of systems involving a high number of such channel usage, the high speed switch sampling by computer technique is naturally required for automatic operation. In the reference article on page 1439, the authors state that to attempt speech interpolation on a single channel for two independent conversations is disadvantageous since the probability of both talkers speaking at the same time is high.

Nevertheless, since time is money, it is not to be overlooked that data information rather than a talker may be injected during such talkspurt gaps. In any event, even where high skill is present, the overcoming of apparently insurmountable obstacles encountered in attempting use of the same available transmission channel for the optimum handling of either voice or data on a time shared basis is difficult to contemplate. The data link end need not be detailed for as known it usually encompasses available input-output data converters, storage recorder devices and other digital hardware. The exploratory technique advanced herein centers on the elimination of the barriers that handicap interfacing the transmission channel with either voice or data center links.

By example reference to FIG. 3, examine the functional instrumentation that allows the intermediate select channel mode and the normal voice mode channel operation of this present invention to give a like double duty in accommodating lulls in talk. Contrawise to prior art, the herein transmission channel is distinctly tailored to the voice and data situation being detected. Accordingly, in the novel procedure set forth, let the inboard channel band that is made selectable be set to operate with its normal voice modulation input. As soon as the speaker pauses, the inboard channel band II, (B1) switches, as in the ganged manner of VOX 413 operation delineated herein to then deliver data transmission output via its aforedescribed "intermediate quadrature select" mode. Thereupon, as soon as an utterance is detected during the pause delay, the inboard channel II reverts by switching from the data channel operation to its voice or speech channel mode. Again as soon as the speaker pauses, the data transmission is resumed. Using means as known to the art, data information at CIFC 414, is recorded, readily stored, and band compressed for speedy transit supply during the short time intervals. Also within the information processing means located conventionally in Function Center 414 the voice conversation may be recorded and played back in transit between talker and listener so rapidly that an utterance goes unnoticed as it is delayed but a small fraction of a second. In the described use, speech is naturally given priority over data, and functions as the primary sideband channel II mode that is allowed VOX 413 switchable control over the secondary quadrature channel II operation.

Thus, conventional terminal equipments that detect the silent gaps of voice messages, and that automatically insert data information during such moments to the communications link input are readily incorporated to perform with the duo-modulation capabilities delineated by way of this communications system invention.

Working from the transmission standpoint alone, the four channel capacity is in effect expanded as an equivalent five channel operation without increased bandwidth, in establishing optimum time utilization by the duality of modulation modes for supplying either voice or data sideband information content into the same selected inboard spectrum band.

For completeness of the overall communication, the multiple aspects of the reception mode of this presently described system is broadly considered at this point, and specific single sideband demodulation description is given later on in the section directed to FIG. 5 drawing.

For a bi-lateral arrangement, the double balanced modulators 108, 208, and 701; along with the common and here doubled modulators 113 and 213, are of the well known diode ring modulator type, which are also known to be operable as demodulators. It is recognized that the transmission characteristics of the ring diode modulator, which is inherently double balanced by its symmetrical nature, is reversible. Its transmission curve as a function of frequency remains the same for the bilateral direction. In the case of the reversed operation, there is a change of unwanted frequencies, that is the undesirable modulation products. They are, however, readily suppressed by the output filter terminations of the DBM's. Again in FIG. 1, direct connection inputs are shown being used for the audio modulating signal band inputs to double balanced modulators 113 and 213, but if more isolation is desired the channel bands may be first combined with linear sum networks before modulation as is shown later on in FIG. 4. Thus, with double balanced modulators, of which ring diode modulators are an example, the distinction between the modulation and the demodulation process is normally related to the numerical frequency values and their direction applied; where the former process results in higher frequency output for low frequency input and the latter process is the reverse translation operation. Hence, an overall communication system with a symmetrical bi-directional signal path processing of the quadrature operation, a two way simultaneous voice transmit and data reception mode of operation can further be established by way of this invention.

In being utilized for a two-way radio communications operation, this system comprises an IF-RF up-link channel and an RF-IF down-link channel. The down-link RF carrier is derived for an AFC/APC RF–VFO tune tracking loop located at the receiving front end from the information band content that is transmitted as ASSB. The reception aspects of this method of duo-modulation is given in further detail in FIG. 5 description. In effect, a process of multichannel sequential demodulation is possible by way of transceiver operation with voice controlled voice band switching of the system; whereby data reception is made on the other channel quadrature band during lulls in transmission.

To denote to the receiving system what time portion of reception content is voice and when the information nature is of the data type, a cueing signal needs to be simultaneously applied and supplied. Within this present invention circuits arrangement, this action is best provided in the adding a cueing carrier at the high frequency end of the quadrature channel, besides the always available pilot carrier at the transmission output. This is made possible by applying a carrier reference tone signal during the data transmission mode to the direct quadrature channel modulator only via LPF 700*a*, and leaving the translated intermediate quadrature channel (IQC 700) modulation unchanged. In this way the character of the transmission messages may be readily detected at the receiver. For voice, only the injected pilot carrier is present and used in the receiver AFC/APC control action. For data, the pilot carrier and the cueing carrier are simultaneously received, with the cueing carrier then being demodulated as a tone indicative that data content is present.

In the above manner as basically outlined, what is broadly related to multi-plex operation as in prior art may, within the context of this present communications systems invention, be more properly designated as an "iso-plex" process that features a duality of modulation modes separable within a common sideband channel. This "iso-plex" nature is more clearly noted and fruitful when communications are made within isolated mediums.

In view of the multi-processing described in the foregoing, "iso-plex" operation more directly prefers voice/data communications within the high separation of differing mediums providing the maximum use of selectable bi-directional properties for system operation as may be effected with a singular modulator-demodulator carrier system reference.

It is an important consideration, as repeatedly pointed out, that the delineated duo-modulated performance results in what may be described as an accommodated modulation sharing of a single spectrum band channel or a "pal type" communication operation, whereby the natural characteristic most suitable to each information mode in use is properly retained. For voice modulation, a great dynamic range exists as acquired by full carrier and undesired sideband suppression from asymmetrical channel operation with the subsequent delay distortion of no concern. In data processing, where a lesser need of great dynamic range exists, linear delay characteristics supplied by symmetrical channel operations insures waveform preservation and likewise, a demodulation capability is introduced therefrom.

It is in relying upon the associative conditioning in the mode duality approach for the common channel output band of this communications system that distinctly identifies itself as being appropriately matched to handle the applicable transmission content in a predetermined accord with the peculiarity of the information input source. The traffic path being so distinguished, then the action of the duo-modulation system operation exhibits a time sharing of directed signal companionship within a same and selectable band slot; and the incorporation of such a characteristic property behavior finds itself most aptly related and best termable as a "Pal Communications System."

As one examines the useful categories given in the technical paper "Classification of the Processes of Modulation and Transmission" by G. C. Tarr, in IEEE Transactions on Communications Technology Vol. COM–12, No. 3, September 1964, pages 108–109; the herein subject method of communications is a newcomer to the demand matched system alternative of the channel access process, and its definitive naming as made herein suitably denotes the descriptive action.

In general, for independent sideband (ISB) operation without carrier insertion, the proper output levels of the RF components may be expressed as $USB+LSB=100\%$ out; wherein USB and LSB need not be of equal amplitude. Once the USB and the LSB percentages have been set, the RF power output is usually varied and set for rated power input into the antenna by providing the proper common drive level without altering the sideband proportions in any way.

Now as is well known in the transmission art, it is possible to set the sideband levels in many ways, independently of each other, depending upon type and form of operation. One may suppose that the maximum total voltage of SSB–ISB systems for SSB only operation may then be at 100% and consist of either LSB or USB content alone. In the case of ISB operation, both sidebands may be operable at the same time and one may suppose that one-half the available power shall be in each sideband, for a unity gain channel ratio condition. However, it is also possible to apportion the system drive voltages so that one sideband carries more power than the other sideband. For example, the transmission system's channel gain ratio may be factored whereby the USB channel gain may be adjusted so that the audio peaks drive the system say 20%; while the LSB channel is being adjusted for the remaining 80% with the total being 100%. Such division operation is experienced in practice as separate intelligence occurs, where voice modulation is maintained in one channel, while teletype type modulation is simultaneously present in the other channel.

Observe that in HF radio systems with a small number of channels, the speech volume input is controlled, that is, maintained on the several channels at predetermined levels, to closely operate the transmission system output at near the overload point. In a multi-channel (MC) system, the channels are usually all kept at equal power levels. Hence, the linear quadrature channel summation results in an amplitude doubling of the desired quadrature sideband, while the undesired channel I (or channel II) sideband content is unchanged. The reinforced quadrature sideband, along with the undesired content, may then be further reduced with attenuation by a factor of two prior to filter separation. Thus, the undesired content is again further reduced.

Examine with further clarification, the alternate on-off control of this Pal Communications Systems invention, taking added note of a rather unique use of alternate voice data control apparatus that is presently available, referring to this featured operation as a unique Power Rated Control capability for the transmission method.

For example let the four (4) independent sidebands sketched as [2] shown in FIG. 2 be in full voice use with the level being set to transmit at the rated power output of the transmitter. With the aforedescribed USB–B1 inboard channel II, VOX and alternate IQM data control, a gain boost for the data channel mode is allowed, as observed from sketch [3] of FIG. 2.

As the summation alternative, the quadrature channel is set at high level and then the desired sideband combining gives an even greater channel amplitude ratio prior to proper amount attenuation. Here a pair of matched linear phase variable gain amplifiers may be inserted into each of the quadrature signal processing paths at the outputs of the first pair of double balanced modulators to control the levels of the 0 to 1500 c.p.s. band signal content. This procedure allows a further increase of the output channel level ratios, whereupon with suitable amount of attenuation after quadrature addition, equal channel power relationships result in the further suppression of the undesired sideband content to a negligible level.

This useful performance is clear since voice peaks are known to extend beyond data peaks, and thereby set the operating level thereat. Thus, the value of the prior mentioned amplitude ratio boost operation via separated amplification within the pair of quadrature modulation paths becomes equally evident. Hence, even with alternation, the inboard USB–B1 channel is kept at a like level though combinational use is made of the common RF modulators. It can be further seen that with such a duality of signal processing, the application for automatically controlling the channel gains of the system for the total independent sideband operation is more readily effected than would normally be the case; for herein the data channel path is kept separate.

For the oppositely offset virtually carrierless method of sideband generation exampled herein the low level voice modulation is deemed suitable since carrier suppression by the SSB type asymmetrical filters is not relied upon. The signal with the channel bands may be amplified by suitable USB and LSB amplifier stages following their sideband filters. Hence, in a futrher extension of this approach, the voice modulation may be made at a lower level and thereafter sideband channel amplifiers employed following each of the asymmetrical crystal sideband filter stages prior to the combining operation. In a similar vein that also contributes to the establishment of the equal amplitude relationship between the channels, suitable attenuation may be inserted in the signal path between the wiper output of MS 7 and linear sum network 717 input. Remaining always effective is the suppression obtained from the following single channel I or II bandpass filters in the common signal path.

Significantly advanced, therefore, as previously described from the "Automatic Alternate Voice/Data Systems" as presently in existence for telephone line operations, the iso-plex operation may then be accordingly applied to fully secure the advantageous use of the duomodulated capacity of this Pal Communications Systems Invention.

It should be particularly noted that in retaining the same band-frequency requirements, the Pal Communications System accomplishes the near simultaneous transmission on a selectable common channel of two messages having a differing modulation characteristic. The resultant saving in equipment and the efficient performance utilization of the spectrum fully overcomes the economic barriers that stand as the obvious detriments for modulation of present art communication methods to provide a similar capability.

QUADRATURE FUNCTION MODULATION SIGNAL ANALYSIS AND SIDEBAND SPECTRUM PROCESSING

Referring now to FIG. 4, where the signal analysis and spectrum processing sketches demonstrate the intermediate quadrature modulation steps and resultant sideband generations for the case of position 2, or channel II selection. Since quadrature type operations are by nature bi-directional, the reverse analysis may be made pertaining to the condition of signal demodulation such as is encountered in the FIG. 5 reception mode diagram. It has been the convention in prior art communications analysis to theoretically carry forth the mathematical relationships with respect to an entire audio input band, as earlier expressed by the complex signal representation of $$e(t)=\sum_{1}^{N} E_n \cos (W_n t+\phi_n)$$

Herein, a distinct departure from this standard approach is taken for best understanding the physical actions in the operations that result from quadratic functions. In effect, the baseband end points are individually carried forth in the mathematical analysis, since in quadrature operation, the modulating voice signal components that develop between the band terminations with respect to the baseband center undergo signal processing in a like manner; with the designated DC coupling of modulator inputs allowing transmission of terms at the mid-band locations.

Therefore, consider the following two frequency signal method of examination. Let one frequency term be designated $f_L$ as the lowest modulating tone and this term further represent all audio terms developing below the mid-frequency value of the audio input spectrum band. Let the other term be $f_H$ and represent the highest frequency and all frequency components that then develop above the mid-band frequency of $f_m$. The total bandwidth is thus $(f_H-f_L)=BW$; and $[f_M=f_L+\frac{1}{2} BW]$. This type of analysis may be directed to serve a dual purpose, for a close analogy is observed between the derived expressions and the mathematical explanations found in the specifications of my U.S. Pats. Nos. 3,369,176 and 3,411,080. From this it becomes clear that an inherent property of poly-modulation intermediate quadratic function operation leads to producing selective filtering action when used in demodulation process.

As stated above with respect to band input sketch designations as shown in FIG. 3, a more broadly set mathematical analysis for quadrature operation is acquired by directing the typical input band formally expressed on a unity amplitude basis in detail with respect to the mid-band frequency as represented by the referred spectrum sketch, or $$\sum_{1}^{N} \cos (W_n t+\phi_n)=\cos (W_M t+\phi_M)$$

$$+\sum_{1}^{N} \{\cos [(W_M-W_{a_n})t+\phi_n]+\cos [(W_M+W_{a_n})t+\phi_n']\}$$

Hence, as a three position summation, the low band end point becomes $\cos [(W_M-W_{aN})t+\phi_N]=\cos (W_L t+\phi_N)$ at and occurring near this extreme, and proceeding to the high band end point $$\cos [(W_M+W_{aN})t+\phi_N']=\cos (W_H t+\phi_N')$$

with the primed notation particularizing base values occurring at the other limit and above the mid-point.

Observe that the mid-band term when multiplied by itself direct or in quadrature produces a DC term and a doubled frequency term, as per example $$[\cos (W_M t+\phi_M)] \cos W_M t=\tfrac{1}{2}\{\cos \phi_M +\cos(2W_M t+\phi_M)\}$$

wherein $\cos \phi_M$ is a DC component.

Since a DC term input recognized results in the modulated carrier frequency signal output itself, the DC term is momentarily omitted in the mathematics set forth, rather than pursuing a three frequency analysis process.

Thus a simpler two tone operation develops by letting $W_{aN}=W_a$ with $\phi_N=\phi_1$ and $\phi_N'=\phi_2$.

This three component expression appears to be analogous to an AM modulated signal, but the notable distinction of the primed phase connotation used herein clearly illustrates the absence of a modulation process. Likewise, the subsequent two tone signal representation is frequency analogous to double sideband, but does not possess phase coherence. It is the incoherent phase relations that allow the independent establishment of the expanded three component form of expression.

THE ELEMENTARY MATHEMATICAL SIGNAL ANALYSIS AND THE THEORY OF INTERMEDIATE QUADRATURE FUNCTIONS MODE

With respect to the FIG. 4 drawing, operation products make use of the well known trigonometric identities defined as:

$$\sin A \sin B = \tfrac{1}{2} \cos (A-B) - \tfrac{1}{2} \cos (A+B)$$
$$\cos A \cos B = \tfrac{1}{2} \cos (A-B) - \tfrac{1}{2} \cos (A+B)$$
$$\sin A \cos B = \tfrac{1}{2} \sin (A+B) + \tfrac{1}{2} \sin (A-B)$$
$$\sin A \cos A = \tfrac{1}{2} \sin 2A$$
$$\cos\left(A-\frac{\pi}{2}\right) = \sin A \text{ and } \sin(-A) = \sin A$$

In FIG. 4, the operational steps therein are located by the encircled capital letter designations. At application point Ⓐ, let the audio band B1 signal input be generally expressed simply as:

$$\{\cos [(W_M - W_a)t + \phi_1]\} + \{\cos [W_M + W_a)t + \phi_2]\}$$

where, $(W_M - W_a) = W_L$ = lowest frequency modulating signal input, and $(W_M + W_a) = W_H$ = highest frequency modulating signal input. The bandwidth of input band B1 then becomes $BW = (f_H - f_L)$ with a mid-band frequency of $f_M = (BW/2 + f_L)$, where $(BW/2 = f_a)$. Hence, the two band frequency extremes are carried forth in the following analysis, and are referenced with respect to the mid-frequency $f_M$ of the band. In actual data/voice modulation, the above tones, along with simultaneous and/or random tones occur within the band region. Accordingly, each and every tone that appears at any moment of time may be treated in the similar analytic manner; and the elementary relationships given below properly exemplifies the nature of the modulation process involved and demonstrates the subsequent results of the described operation.

In the output of double balanced modulator (DBM) 208, a product operation of signal Ⓐ multiplied by common mid-frequency carrier signal (cos $W_Mt$) takes place resulting in signal Ⓑ. This is expressed as $$\tfrac{1}{2}\{\cos [(2W_M - W_a)t + \phi_1] + \cos (W_at - \phi_1) + \cos [(2W_M + W_a)t + \phi_2] + \phi_2] + \cos (W_at + \phi_2)$$

The mid-band frequency signal, cos $W_Mt$, feeding to 90 degree lagging phase shifter 702 produces at the output, [cos $W_Mt - 90°$] = sin $W_Mt$, which thereupon serves as the common input to DBM 701 and the product multiplier (704 and 705) of the Intermediate Quadrature Channel 700.

At DBM 701 output, signal Ⓒ result from $$\{[\cos (W_M - W_a)t + \phi_1] + \cos (W_M + W_a)t + \phi_2]\} \sin W_Mt$$

which becomes $$\tfrac{1}{2}\{\sin [(2W_M - W_at + \phi_1] + \sin [(2W_M + W_at + \phi_2] + \sin (W_at - \phi_1) - \sin (W_at + \phi_2)\}$$

With LPF 700*a* having its $f_{c.o.} \approx > t_a$, the filter operation in the output of DBM 208 passes only the lower sideband products of signal Ⓑ. The output signal Ⓓ of LPF 700*a* is thus $\tfrac{1}{2}[\cos (W_at - \phi_1) + \cos (W_at + \phi_2)]$. Likewise, the output signal E of LPF 703 consists of lower sideband terms only, or $$\tfrac{1}{2}[\sin (W_at - \phi_1) - \sin (W_at + \phi_2)]$$

and is applied to input of DBM 706.

Product multiplier (704 and 705) output is $$\sin W_Mt(\cos W_Mt) = \tfrac{1}{2} \sin 2W_Mt$$

This signal output represents the second quaudrature carrier input for the direct signal processing path of the Intermediate Quadrature Channel 700; having a frequency value of twice the midband frequency value or $2f_M$, and being of halved amplitude level may be compensated in a number of ways. An amplifier may be used between the multiplier and the double balanced modulator 706 to again attain unity amplitude. For convenience, the second carrier signal $2f_M$, is assumed to be set at unity level, and accordingly, the product operation that occurs at DBM 706 results in quadrature sideband signal F which is expressed as $$\tfrac{1}{2} \sin [(W_at - \phi_1) - \sin (W_at + \phi_2)][\sin 2W_Mt] \text{ or}$$
$$\tfrac{1}{4}\{[\cos (2W_M - W_a)t + \phi_1] - [\cos (2W_M + W_a)t - \phi] - [\cos 2W_M - W_a)t - \phi_2] + [\cos (2W_M + W_a)t + \phi_2]\}$$

With the band pass filter combination of HPF 210 at $f_{c.o.} \approx < (2f_M - f_a)$ and LPF 211 of $f_{c.o.} \approx > (2f_M + f_a)$, the filter operation passes the sole quadrature sideband signal Ⓕ with linear time delay to become signal Ⓖ as indicated.

In the exampled phase shift method of oppositely-offset carrier signal generation, the operational analysis of the coherent dual frequency local oscillator signal generator 900 is as follows: The mid-band carrier signal of $f_m$ = 1800 c.p.s., expressed as cos $W_Mt$ is applied as the common input to the pair of phase shift network; phase shift = −45°, 901 and phase shift = +45°, 902. A constant 90° phase difference results between the signal outputs of the 901 and 902 phase shifters, where one output may be referenced as cos $W_Mt$ and the other output being (cos $W_Mt - 90°$) = sin $W_Mt$.

Common mid-frequency carrier signal, cos $W_Mt$, is synthesized from FSTD reference of Communications System 400, which also represents cos $W_ct$. F mid-base band synthesizer source is similar to stage items 501–503 of FIG. 1. Other known usable synthesis techniques are dividing by 5 to give 20 kc., which heterodynes with a 2 kc. signal divided by 10 therefrom, resulting in a 18 kc. difference product that divided by 10 generates 1800 c.p.s.

The pair of phase shift networks, phase shift networks, phase shift = −45°, 903, and phase shift = +45°, 904 receive the virtual carrier frequency signal of cos $w_ct$, where $f_c$ = 100K c.p.s., as their common input signal. The resulting constant 90° phase difference signal output become cos $W_ct$ for phase shifter 904 output and (cos $W_ct - 90°$) = sin $W_ct$ for phase shifter 903 output.

The quadrature pair of signals cos $W_Mt$ and sin $W_Mt$ become the modulating signal inputs to balanced modulators 906 and 905 respectively. Likewise, the signal pair cos $W_ct$ and sin $W_c$ are applied as the respective carrier signal inputs to the balanced modulators pair 906 and 905. With the modulators balanced to suppress the carrier $f_c$, the product modulation output of balanced modulator 905 is expressed as $$[(\sin W_ct)(\sin W_Mt)] = \tfrac{1}{2}[(\cos (W_c - W_M)t - \cos (W_c + W_M)t]$$

At balanced modulator 906 output, the double sideband result becomes $$[(\cos W_ct)(\cos W_Mt)] = \tfrac{1}{2}[\cos (W_c - W_Mt) + \cos (W_c + W_M)t]$$

These modulator signal outputs are fed as inputs to a pair of linear combiners, sum combiner 908 and difference combiner 907.

At the sum combiner 908, output, signal addition takes place resulting in cos $(W_c - W_M)t$, which is the difference product term of $(f_c - f_M)$. Accordingly, the resulting output of the difference combiner 907 is the upper frequency component of cos $(W_c + W_M)t$. In this oppositely-offset modulation process, $(f_c + f_M) = f_o$, and therefore $$(f_c - f_M) = (f_o - 2f_M)$$

Hence, $[\cos (W_c - W_Mt] = [\cos (W_c - 2W_M)t]$ and $$\cos (W_c + W_M)t = \cos W_ot$$

Numerically expressed, this becomes 101.8 kc. = $f_o$, and 98.2 kc. = $(f_o - 2f_M)$. The cos $(W_o - 2W_M)t$ output of linear sum combiner 908 is applied as the carrier signal to double balanced modulator DBM 213. The cos $W_ot$ output of linear difference combiner 907 feeds to DBM 113 as its carrier output.

Returning to the signal processing path, linear channel combiners 113*a*, 113*b* and 213*a* are shown in use for the multi-channel ISB operation, and such application is a standard procedure. The two combiners in the path between LPF 700*a* and DBM 113 allow for simultaneous application of the modulation bands of channels I and III, while combiner 213*a* provides for the modulation injection of channel IV. Such operation has been earlier described with respect to FIGS. 1 and 3 and is illustrated at this point for reference. Further analysis will only concern itself with the quadratured signal operation since the prior explanations adequately cover the processing of channels I, III and IV.

Consider then only the band signal D output of channel combiner 113*b* as the modulating signal input to DBM 113, and the band signal output G output of channel combiner 213*a* as DBM 213 modulation input. For the direct quadrature process, a product operation of signal D multiplied by carrier signal cos $W_ot$ takes place resulting in signal H. Here the product is further expressed as a sideband output of DBM 113 represented by $$\tfrac{1}{4}\{[\cos (W_o-W_a)t+\phi_1]+[\cos (W_o+W_a)t-\phi_1] +[\cos(W_o-W_a)t-\phi_2]+[\cos (W_o+W_a)t+\phi_2]\}$$

Observe these frequency components unfold as a full quadrature sideband contained within the band limits of one channel. The accompanying band modulation inputs of channels I and III to DBM 113 develop product components in the output that locate about the quadratured sideband channel in the manner shown by the Channel Operation sketch 3 of FIG. 2. The passage of the desired channel I and III sideband outputs is accomplished by applying DBM 113 output over one path to the inputs of the SSB crystal asymmetrical filters, channel I–115 and channel III–615. Subsequent operation over this signal path direction occurs in accordance with the earlier description given for FIG. 1. Over a second path, the sole quadrature sideband signal H is applied to, and passed unattenuated by the symmetrical bandpass filter 715*a*, and is designated as band signal H'.

For the intermediate quadrature channel process, the product operation that occurs in the output of double balanced modulator 213 is signal band G multiplied by carrier signal cos $(W_o-2W_M)t$, resulting in signal I. Analytically, the output result is expressed as $$\tfrac{1}{8}\{[\cos (W_o-4W_M+W_a)t-\phi_1]+[\cos (W_o-W_a)t+\phi_1]-[\cos (W_o-4W_M-W_a)t+\phi_1]-[\cos (W_o+W_a)t-\phi_1]-[\cos (W_o-4W_M+W_a)t+\phi_2]-[\cos (W_o-W_a)t-\phi_2]+[\cos W_o-4W_M-W_a)t-\phi_2] +[\cos (W_o+W_a)t+\phi_2]\}$$

The signal band input of channel IV as combined and applied to DBM 213 input develops modulation products in the modulated output that positions about the double sideband quadrature output as also illustrated by the Channel Operation sketch 3 of FIG. 2. The passage of the desired channel IV sideband output of DBM 213 is made by feeding over one path to the input of SSB crystal sideband filter 815, where the asymmetric filtering action follows as described for FIG. 1.

Over the second path, the double sideband output signal (I) is applied to symmetrical bandpass filter 715*b*, which by design is similar to BPF 715*a*, having its center frequency value at $f_c$ and being of flat bandpass region encompassing channels I and II bandwith, BPF 715*b* passes unattenuated only the USB component content of DSB signal (I) and readily rejects the LSB terms. The passed signal indicated at (I') output of BPF 715*b* is thus the upper sideband product of $$\tfrac{1}{8}\{[\cos (W_o+W_a)t+\theta_2]+[\cos (W_o-W_a)t+\theta_1] -[\cos (W_o-W_a)t-\theta_2]-[\cos (W_o+W_a)t-\theta_1]\}$$

The Ⓗ' band signal output of BPF 715*a* feeds to Time Delay Compensation and Amplitude Equalization Stage 716. TDC and AE stage 716 functions to negate the time delay occurring to band signal Ⓕ, which compensates for the delay introduced by the HPF–LPF combination, with Ⓕ delay representing band signal Ⓖ; and to equate amplitude in compensation for losses in the second quadrature of the IQC operation. Equalization between the Intermediate Quadrature Channel IQC 700 and the other direct channel used in the quadrature system transmission may be brought about by various known techniques. A most recent technical paper, "Generalized Automatic Equalization for Communications Channels," by R. W. Lucky and H. R. Rubin in "Digest of Technical Papers" 1966 IEEE International Communications Conference, describes a broad approach.

With proper channel equalization, the band signal Ⓗ'' of TDC and AE stage 716 is applied to one of the inputs of linear sum combiner 717. The other input to the linear sum combiner 717 is being supplied from the output of BPF 715*b* as band signal Ⓘ'. The sum combined output of band signal Ⓙ results from Ⓘ' added to Ⓗ'', and can be expressed as $$\{[\cos (W_o-W_a)t+\theta_1]+[\cos (W_o+W_a)t+\theta_2]\}$$

Hence, the foregoing analysis demonstrates that the audio modulating band B1 input signal of Ⓐ represented by the expression $$\{[\cos (W_M-W_a)t+\theta_1]+[\cos (W_M+W_a)t+\theta_2]\}$$

is modulated as a SSB output at channel II with respect to the Virtual common carrier frequency value of $f_C$ (as $W_c$); and becomes $$\{[\cos (W_o-W_a)t+\theta_1]+[\cos (W_o+W_a)t+\theta_2]\}$$

at $W_o=(W_c+W_M)$ for channel II. A like operation can be demonstrated in the quadrature analysis for the case of selectable channel I signal processing; and for the reverse process, demodulation occurs.

Recall that the normal voice band input was directed into three equidistant frequency component locations, the mean or mid-frequency in the center and on either side a terminal frequency component of equal maximum frequency difference from the mid-band value, with twice this frequency difference establishing the BW amount.

Since the summation of term components is in effect, for completeness now separately consider the inclusion of the prior DC terms as follows:

Let term of ($\tfrac{1}{2}$ cos $\theta_M$)$=K$, and for quadrature the DC term becomes $-\tfrac{1}{2}$ sin $\theta_M=K'$. Then direct modulation gives $K$ cos $W_ot$; and intermediate quadrature gives $K'$ sin $2W_Mt$ with subsequent direct modulation producing $$\frac{K'}{2}(\sin W_ot+\sin (W_o-4W_M)t$$

Passing only $$\frac{K'}{2}\sin W_ot$$

combining gives $$\frac{K'}{2}\sin W_ot+K\cos W_ot$$

which thus represents the mid-band component.

While the mathematical relations derived analytically express the principles of the basic modulation method that verifies the operational signal processing technique, it is not to be construed that the subsequent structural translation of such conceptual theory into a functional overall Communication System complex exploiting more traditional circuit implementation is accomplished as a trivial engineering task.

However, an additional simplification is possible since the signal relationships of cos $W_mt$, sin $W_mt$, and cos $W_ct$ already exist in the system embodiment of FIG. 4 and may be directly used. Thus in another design, the four illustrated 45° phase shift networks, 901 through 904, may be omitted; with a single suitable 90° phase shift network at $W_c$ used to produce the sin $W_ct$ carrier signal for application to balanced modulator 905. The coherent double sideband operation for the I.F. pair carrier signal generation, either by way of embodiment of FIG. 1 or FIG. 4, maintains phase equalization between the two channels during the quadrature signal process, and the system's stability is governed by developing phase relations in step with the singular IF reference carrier signal.

This action is noted to result as a consequence of the interrelationship between the doubled mid-frequency intermediate carrier signal and the same existing between the final pair of coherent frequency oppositely offset IF carrier signals. Whereas the intermediate carrier signal frequency of 3600 c.p.s. relates to the frequency offsetting value of 1800 c.p.s. on a two to one basis with factor $n=2$; other $n$ factors of $f_m=1800$ c.p.s., such as 5400 c.p.s. to 2700 c.p.s. for $n=3$, 7200 c.p.s. to 3600 c.p.s. for $n=4$. etc.. may be found suitable in application where selectable outboard quadrature modes are desirable, or in singular use.

In a generalized embodiment, a half frequency divider (÷ 2) connects the intermediate carrier signal, prior to 90 degree phase shifting, to the modulating signal input of the oppositely offset local oscillator generation section. The preferred example embodiments of this specification concern the lowest $n$ factor case that establishes the selectable quadrature between the inboard channels.

RECEIVER SYSTEM OPERATION

For the explanation of a featured reception capacity within the confines of this communications system embodiment, consider in use a receiving antenna 406' and a superheterodyne frequency stabilized RF–IF translator 400 that comprises a RF pre-selector and first mixer with IF amplifier along with a second mixer and second IF amplifier. Let the second IF amplifier center frequency correspond to the system carrier frequency and the second IF BW encompass the ISB common BW of channels I through IV. The receiver tuning oscillator signals may be derived and supplied by a common frequency synthesizer or by an AFC/OPC VFO operation of the system.

Transceiver operation at the same frequency may also be accomplished by making "VOX" switchable use of common tuned circuits and heterodyne injection signals in receive and transmit modes. For example, referenced to the desired IF value, say 100K c.p.s., or 99K c.p.s., equivalent use may be made of the RF translator in the manner illustrated by FIGS. 19–3, page 312, and described on page 313 in the 1964 publication, "Single Sideband Principles and Circuits," authored by E. W. Pappenfus, W. R. Bruene, and E. O. Schoenike, McGraw Hill Book Co. In a like switchable manner, with suitable design as known in the art, to the illustrated circuit arrangement of FIG. 1, the common asymmetrical channel filters may be used in both the transmitting and receiving paths associated with the remaining channels in handling voice information.

For purposes of convenience herein, only a two channel system reception operation is illustrated in FIG. 5, wherein the stage reversals have already been made. In the exampled case, channel II is shown connected in quadrature select position, with its non-data handling path disconnected, and channel I set to accept voice transmission.

In the convention of the art, the signal process for reception now proceeds in the opposite manner to that given for FIG. 1, that is, with a left to right direction in FIG. 5. Since by way of demodulation, a reverse signal process of that given in the modulation and transmission description of FIG. 1 takes place, no detailed treatment of the paths in the reception mode is required. In view of the foregoing description that includes the basic analysis of FIG. 4, consideration is now given to the alternative aspects and other developing features brought forth in reception.

Therefore, in illustrating the essentials of SSB reception, the Receiver Operation block diagram of FIG. 5 shows a further alternative local oscillator oppositely offset signal generation, where now singular audio reference control is described for a 99 kc. virtual common carrier frequency value. Here the oppositely offset-phase coherent audio referenced ISB-carrier-local oscillator signal supply section is obtained by a harmonic filter method as implemented by the circuitry arrangement of the designated 910–920 series stages.

The local oscillator signals are derived from the 3600 c.p.s. common audio reference crystal oscillator source 911 to insure the constant phase and frequency relationship between them. The reference 3600 c.p.s. signal serves as the 2nd DMB carrier signal, and is also supplied as the common input for frequency divider (÷2), 912, and for Schmitt trigger circuit stage 913. The 1800 c.p.s. output of frequency divider 912 becomes the 1st DBM carrier signal and is further used in the AFC/APC SSB receiver operation described later on. The pulse output of Schmitt Trigger circuit 913 is fed to Trigger Amplifier stage 914 for further amplification. The sharp pulse output of amplifier 914 triggers blocking oscillator 915 at the fundamental rtae of 3600 c.p.s. The pulsed blocking oscillator 915 output, with its subsequent high harmonic content, is applied as the common input to USB carrier filter 916 of center frequency value 100.8 kc., and to LSB carrier filter 917 of 97.2 kc. center frequency. Hence, USB carrier filter 916 passes only the 28th harmonic of 3600 c.p.s. or 100.8 kc.; while LSB carrier filter 917 accepts only the 27th harmonic or 97.3 kc. The pair of filtered outputs become the oppositely offset local oscillator signals, with their frequency difference being 3600 c.p.s. as required, so that each is offset 1800 c.p.s. from the common virtual 99 kc. carrier value of this illustrated receiving system operation.

To extract this virtual carrier frequency signal for desired pilot carrier use, the 100.8 kc. output of USB filter 916 feeds via USB output amplifier 918 as the local oscillator signal for channels II and IV operation at DMB 213;, and it is also applied as one input to balanced mixer 920. The 97.2 kc. output of LSB filter 917 is applied through LSB output amplifier 919 to DMB 113 as the local oscillator signal for channels I and III; and, over a second path, feeds as the other input to balanced mixer 920. Balanced mixer 920 produces sum and difference frequency products in its output, and the Sum Band Pass Filter 921 of center frequency value 198 kc. passes only the sum frequency component. The 198 kc. signal output of sum BPF stage 921 feeds to frequency divider (÷2) 922. The frequency divider output of divider 922 is applied to band pass filter 923 of 99 kc. center frequency value, and the 99 kc. passed signal output becomes the transmission system's virtual carrier signal for reinsertion as the pilot.

Here, in the arrangement of FIG. 5, the subject carrier local oscillator signals are harmonically derived from a common single source, and a control system is employed that insures a constant phase and frequency relationship between them.

Advantage is then taken of the fact that while the harmonic generation increases phase difference, the increase is proportional to the harmonic factor. Phase equalization is therefore made within one local oscillator signal path to produce the identical phasing as required.

Control systems for automaticqally maintaining the phasing relationship between two signals of different frequencies are known to the prior art, one recent example being given in U.S. Pat. 3,267,357 issued Aug. 16, 1966. Much in like accord with such phase control techniques, the following action occurs within the described closed loop operation. While the sum product of mixer 920 is twice the mean frequency of the pair of local oscillator frequencies, the difference product, ΔF, produced thereby is directly usable, and frequency-wise becomes (100.8 kc.—97.2 kc.) = 3600 c.p.s.

This difference frequency output of $\Delta F = 3600$ c.p.s. is passed by LPF 924 and is applied as one input to phase comparator 925. The system 3600 c.p.s. reference signal is fed to the other input of the phase comparator 925 and DC correction voltage develops at the comparator output. The comparator 925 output connects to the DC voltage sensitive element of the voltage controlled phase shifter 926 that is connected in one signal path of the local oscillator frequency. The phase equalization is made in an automatic coacting manner, as known to the art.

The signal processing paths of the FIG. 5 embodiment result in the symmetrical demodulation of the selected channel II, sideband information obtained at mode switch position 2. The analysis of signal demodulation follows similarly along the functional operations given in FIG. 4, except that the Ⓙ signal becomes the IF input that is applied. Thus in the extraction of its information content, the signal flow proceeds in the opposite manner to arrive at the signal band Ⓐ, here representing the reception output.

The symmetrical band pass filters 715$a'$ and 715$b'$ encompassing channel I and channel II are identical unit structures satisfying the selectivity requirements prescribed by the bandwith limits and their relationship to the 99K c.p.s. varrier value, in accord with the prior examples of BPF's 715$a$ and 715$b$ as they relate to 100K c.p.s. Here in FIG. 5, the AE and TDC 716' stage is set in the audio range with such alternative usage being earlier discussed with respect to FIG. 3. As to be expected, the remaining stages illustrated by the Receiver FIG. 5 drawing are the like but in a reverse flow direction of that given in the earlier FIG. 4, except the primed connotation is used for this 99 kc. virtual carrier system example. Hence, the bi-directional nature of this present communications system invention leads to transceiver operation. A further observation of the uniquely supplied reception performance concerns stable SSB receiver operation. Here in Asynchronous SSB (ASSB—one sideband and pilot carrier) reception, and AFC/APC phase lock operation is effected in the following manner:

An 1800 c.p.s. tone signal is demodulated, resulting in the outputs of balanced modulators 113 and 213, and this tone is representative of the virtual carrier frequency on the pilot carrier in the case of ASSB. With channel II mode being selected as quadrature, then by proper selection it connects the output of DBM 213 to the input of low pass filter 1001. Note that a like 1800 c.p.s. tone signal with error $(\pm)\Delta e$ is also available from the other channel. But this is not preferred since the modulation band inputs cover 0 to 1500 c.p.s. and 2100 to 5100 c.p.s.; whereas the used channel II has only the 2100 to 5100 c.p.s. band input of concern which may be readily isolated by having low pass filter 1001 cutoff frequency set slightly greater than 1800 c.p.s.

The 1800 c.p.s. $(\pm)\Delta e$ error signal output of LPF 1001 is then applied to the unknown signal input of phase comparator 1002; with the comparator's reference signal being obtained from the 1800 c.p.s. audio reference output of divider 912. Frequency control is so attained, by having the error correcting voltage output of phase comparator 1002 applied to the frequency variation means of the VFO in RF-IF translator 400, and producing in a conventional manner the frequency stabilization thereof.

The phase-lock procedure subsequently takes place in the conventional coacting manner of closed loop operation.

The AFC/APC pull-in and hold-in characteristics along with the system's intrinsic frequency stability are, by design, matched to the order required of the technical application in service.

THEORY OF INTERMEDIATE QUADATURE DEMODULATION

An elementary analysis will now be made which will omit carrying forth the added phase terms that would account for the phase characteristics of the filters in the signal paths, and also will set arbitrary phase angles associated the carrier signals to zero, along with having unit amplitudes. However, since the phase characteristics are made exactly the same, then such theoretical considerations are justifiably allowed for otherwise the rigorous analytical functions result in complex mathemathical detail that obscures the physical interpretation of the operational properties, possessed by this method of communications.

With equalization being assumed to occur in this simple examination, the sideband signal demodulation process is mathematically expressed with respect to the equivalent points of Ⓐ through Ⓙ of FIG. 4 as follows:

Let the RF band signal at Ⓙ be represented in accordance with previously established format as:

$$\cos(W_o t+\phi_o)+\sum_{1}^{N}\{\cos[(W_o<W_{a_n})t+\phi_n]+\cos[(W_o+W_{a_n})t+\phi_n']\}$$

Omitting the equalization, which now is shown to take place in the audio region, signal Ⓙ is the RF signal input at points Ⓘ and Ⓗ of the FIG. 4. The product demodulation that occurs for one channel becomes signal Ⓖ output; or $$Ⓙ\times\cos(W_o-2W_M)t=\frac{1}{2}\{\cos(2W_M t+\phi_o)+\cos[(2W_o-2W_M)t+\phi_o]\}+\frac{1}{2}\sum_{1}^{N}\{\cos[(2W_M-W_{a_n})t+\phi_n]+\cos[(2W_o-2W_M-W_{a_n})t+\phi_n]+\cos[(2W_M+W_{a_n})t+\phi_n']+\cos[(2W_o-2W_M+W_{a_n})t+\phi_n']\}$$

The lower sideband or difference terms are passed by the BPF combination in the demodulator output to be signal Ⓕ or $$\frac{1}{2}[\cos(2W_M t+\phi_o)]+\frac{1}{2}\sum_{1}^{N}\{\cos[(2W_M-W_{a_n})t+\phi_n]+\cos[(2W_M+W_{a_n})t+\phi_n']\}$$

The signal demodulation process for signal Ⓓ output becomes:

$$Ⓙ\times[\cos W_o t]=\frac{1}{2}[\cos\phi_o+\cos(2W_o t+\phi_o)]+\frac{1}{2}\sum_{1}^{N}\{\cos[W_{a_n}t-\phi_n]+\cos[(2W_o-W_{a_n})t+\phi_n]+\cos[W_{a_n}t+\phi_n']-\cos[(2W_o+W_{a_n})t+\phi_n']\}$$

The passed difference term output of LPF 700$a$ is thus signal Ⓑ; or $$\frac{1}{2}\cos\phi_o+\frac{1}{2}\sum_{1}^{N}\{\cos[W_{a_n}t-\phi_n]+\cos[W_{a_n}t+\phi_n']\}$$

This represents the band folded over about zero frequency. the cos $W_M t$ product modulation therewith gives at channel output point Ⓐ, the result $$Ⓑ\times\cos W_M t=\left(\frac{1}{2}\cos\phi_o\right)\cos W_M t+\frac{1}{4}\sum_{1}^{N}\{\cos(W_M-W_{a_n})t+\phi_n]+\cos[(W_M+W_{a_n})t-\phi_n]+\cos[(W_M-W_{a_n})t-\phi_n']+\cos[(W_M+W_{a_n})t+\phi_n']\}$$

Returning to the IQC path operation, the first quadrature operation is intermediate and Ⓕ×sin $2W_Mt$ becomes the signal Ⓔ; or $$\frac{1}{4}[\sin(4W_Mt+\phi_o)-\sin\phi_o]+\frac{1}{4}\sum_{1}^{N}\{\sin[(4W_M-W_{a_n})t+\phi_n]+\sin[W_{a_n}t-\phi_n]+\sin[(4W_M+W_{a_n})t+\phi_n']-\sin[W_{a_n}t+\phi_n']\}$$

Here the difference terms are folded over this being $$-\frac{1}{4}\sin\phi_o+\frac{1}{4}\sum_{1}^{N}\{\sin[W_{a_n}t-\phi_n]-\sin[W_{a_n}t+\phi_n']\}$$

Then LPF 703 passes these terms to become the signal Ⓒ. The second quadrature operation is then Ⓒ×sin $W_Mt$ to produce the quadrature channel output portion of signal Ⓐ; or $$\left(-\frac{1}{4}\sin\phi_o\right)\sin W_Mt+\frac{1}{8}\sum_{1}^{N}\{\cos[(W_M-W_{a_n})t+\phi_n]-\cos[(W_M+W_{a_n})t-\phi_n]-\cos[(W_M-W_{a_n})t-\phi_n']+\cos[(W_M-W_{a_n})t+\phi_n']\}$$

Allowing for amplitude equalization and carrier signal level compensation as is done in conventional manner, the resultant linearly summed combining of the two demodulated channel outputs thereat in the audio center, expressed with unity amplitude assumed, becomes:

$$\cos(W_Mt+\phi_o)+\sum_{1}^{N}\{\cos[(W_M-W_{a_n})t+\phi_n]+\cos[(W_M+W_{a_n})t+\phi_n']\}$$

Hence, the received RF band information content of channel II is processed and demodulated to produce the original audio signal band communicated.

OTHER OVERALL COMMUNICATIONS SYSTEMS PERFORMANCE CAPABILITIES

On a transient response basis, the prior art single sideband systems are recognized as being usually quite poor where other than the single tone modulation is applied, as shown in the Coherent Dual Frequency Local Oscillator Generator 900 of FIG. 4. The prime and secondary effects of the classical asymmetrical crystal filter method have been pointed out. For the conventional phase shift method, the phase shift networks, as located in the signal processing paths, are observed to have a phase characteristic approximately proportional to the logarithm of the modulating frequency over the wide (10:1) audio range. This type relationship distinctly indicates that phase distortion is inherent in the process whenever a band of high frequency ratio is to be modulated.

Further, where the 90° in-signal path phase shift operation of 10 to 1 frequency ratio is accomplished by a pair of phase shift networks, unequal time delays develop for differing frequencies in passing through the two phase shifting networks. However, since the information bearing components of a modulating band signal are processed by the 90° audio carriers of the intermediate quadrature modulation method with passage through signal paths that have linear phase to modulation frequency characteristics, this results in fixed time delays to which delay equalization can be applied. Thus, no phase distortion results therein and the fidelity of waveform reproduction is sustained with excellent transient response. It should be recognized that the coherent phase relation between the pair of actual carrier local oscillator signals to the modulators 113 and 213 may be preserved in other ways known to the art, whereby the two heterodyne voltages have identical phase.

By accumulative phase equalization, adjustment is made to alleviate the phase differential; and the time and phase relationships of the quadrature band channels are properly retained prior to their summation.

It is of note that for a band directed to handle data information, for example, constant amplitude signals of audio frequency shift keying (AFSK) operations, then the undesired sideband elimination is dependent upon the balancing of two electrical quantities in phase and amplitude. The SSB signal is thus produced by in-phase reinforced combining and the destructive addition of out-of-phase-components.

In this respect, it is of particular interest that the intermediate quadrature modulation operation does not require IF or RF quadrature action; or any 90° phase shift at other than the given audio region. This feature is valuable since phase shift stability is more easily acquired at audio frequencies than at RF.

By further examination of FIG. 1, it may now be seen that sideband inversion selection is obtainable by a phase reversal of an audio input to common balanced modulator 113 or 213, and where this is desired, as in private transmission, it may be readily effected, with subsequent sideband structure like sketch [4] of FIG. 2.

To accommodate the selection of a quadrature function channel, DC coupling is provided to double balanced modulator 113 and 213, as is also done for double balanced modulation 706. Since the input signal modulating components to the carrier signal frequency of these modulators are close-in or at zero frequency the DC coupling serves to preserve their presence in the modulator outputs. From FIG. 1 and FIG. 2, it is observed that the quadrature sideband channel selection is obtainable by the switching of double balanced modulators 113 and 213 for the quadrature signal inputs while maintaining the three channel voice capacity as described hereinbefore. In this selective operation, the outboard channels remain unchanged while the inboard channels may be interchanged. Where a pair of inboard quadrature channels at one time, along with the filter type outboard channels are desired, it is only necessary to repeat the described mid-channel or intermediate quadrature channel (IQC) stages and deactivate the second inboard channel.

Observe that, while the mid-band frequency value is fixed, a two bandwidth type system is possible since the intermediate quadrature channel gives but one sideband output; for example, a 2800 c.p.s. BW about 1800 c.p.s. or from 400 to 3200 c.p.s. may be accommodated.

It is further pointed out that the unique intermediate quadrature function modulation technique, broadly exemplified by the analysis of FIG. 4 and brought about as described by way of this Pal Isoplex Communications Systems, may separately in itself be applied as a system, whenever the need for channel selectability or interchangeability occurs; and this may be done for a plurality of channels in one system.

In such a singular use the symmetrical bandpass filters **715*a* and 715*b*, need be employed, while BPF's 718 and 719 can be omitted. Now however, BPF's 715*a* and 715*b*** are designated to encompass only the bandwidths of the channel to be used, either channel I or II, over the linear phase-frequency characteristic of the filters actual bandpass region. Here, symmetrical bandpass crystal filters satisfying the selectivity requirements prescribed by Defense Communications Agency circular 175–2A may be utilized, wherein the linear phase characteristic covers over the central 75% of bandwidth. Hence with a 4K c.p.s. total bandwidth design, the usable 3K c.p.s. band of 300 to 3300 c.p.s. experiences a constant time delay that may be readily equalized at RF or audio frequencies. Such a typical DCA channel-100K c.p.s. carrier symmetrical bandpass filter is available for either A1 or B1 channel. For typical design requirements herein, total bandwith is specified to be ±2K c.p.s., from the central frequency of 101.8K c.p.s. Accordingly, in an alternative dual system design, the other filter unit may be in similar paired use at a central frequency of 98.2K c.p.s.

Whereas the exampled embodiment of FIG. 1 makes use of an identical pair of bandpass filters in the common IF modulator outputs that are of a bandwidth encompassing channels I and II, it is clear that as a design alternative, the bandpass filter pair may each be divided into separate bandpass filters to independently allow passage of only the bandwidth for either channel I or II before being combined in a switchable manner. By this approach, only dual pairs of bandpass filters are used in each modulator output; however, the sum total of IF channel bandpass filters in use still remains four, like that of FIG. 1.

In considering further the broad capabilities of a two ISB communications channel operation only, it is notable that the transposed inboard quadrature channel, normally suppressed within the multiple (more than two) channel system, need not be utilized. With the designated lower sideband signal content located at the position of the prior used A2 channel, a suitable bandpass filter (BPF) connection path may be made in the modulator 213 output to allow passage of the formerly suppressed quadrature band be subsequently combined with the aforestated two channel transmission system output. Hence, in such a two channel arrangement, this passed sideband may be indicative of the presence of data information in the receiving system demodulation operation whenever the channel in use is being time switched on a voice and data shared basis as delineated beforehand in the descriptive paragraphs concerned with the herein designated "isoplex" process. At the receiving end, conventional detection of the presence of sideband content in the output of a bandpass filter located at this channel location supplies the initial indicating signal useful in accomplishing analogue VOX multiplexing of the reception stages into its data demodulation mode in a near simultaneous manner such as encountered in the transmission method. Synchronization therewith may be brought about by relegating to the initial presence detection output the role of a coded or cueing signal in the reception process.

The earlier described double sideband operation as shown in FIG. 1 is in keeping with the mode of generation made clear in the prior mentioned transmission system patent, and by signal analysis, the principles of intermediate quadrature modulation may be readily shown at a reference time wherein the applied input signals are at zero phase. From the final example of FIG. 5, the equally practical generation approach employing the direct frequency synthesis of the 98.2 kc. signal from the reference carrier of 100K c.p.s. and the sum product sideband resulting from modulation with the available 3600 c.p.s. carrier signal is observed as suitable for phasing adjustments. Hence, in such application, the frequency synthesized 98.2 kc. carrier is referenced as of zero phase and thereafter, use of a phase equalization network within the path between the carrier signal and the double balanced modulator 213 can be made to adjust for any phase difference between the synthesized carrier and its generated USB signal of (98.2 kc.+3600 c.p.s.).

Therefore, in accord with the given descriptive principles and exampled embodiments of this specification, it has been demonstrated that, independent of the manner of generation by which the pair of offset and specifically, required IF valued carrier signals are brought about, only nine design stages need be structually added within the circuits arrangement of the inventor's prior patented ISB Transmission System. These fundamentally described stages comprise one step producing 90° audio phase shift, three stages each bringing about audio product multiplication, a matched pair of stages allowing linear phase low pass filtering, a pair of filters at the IF region which provides channel band pass filtering, and a stage effecting suitable amplitude equalization and time delay compensation. As associated therewith in a minimal manner of switchable circuits arrangement such as shown by way of this invention, the implemented system thereby formulates the basic essentials of the intermediate quadrature modulation select ISB method of communication.

As a general observation, in view of the symmetrical and bi-directional characteristics for the signal processing paths of the intermediate quadrature method of independent sideband communications, it is clear that no sharp-cutoff bandpass filters are inherently necessary and the uniform time delay is acquired over a wide band of modulation frequencies.

In accordance therewith, a fixed time delay path is equalized producing time-switched "isoplex" operation over a selectable data transmission channel during intersyllable and interword pauses in voice channel modulation within the same spectrum band, and this prevents waste of power in transmitting noise during such time intervals of speech.

Take full note that this instant systematic invention is shown in a composite block diagram form which suitably formulates a workable performance operation in that each block stage used is representative of a fundamental well known circuit functioning within a far from traditional manner of signal processing arrangement.

The combinational duality of the duo-modulation technique, heretofore use almost unnoticed in having been totally unobserved by prior art technology, benefits most effectively from a high degree of stage commonality.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. A single sideband modulation system for a band of audio information signals which comprises:

a direct modulation channel including in series connection a first double balanced modulator, a low pass filter of linear phase-frequency characteristic for passing only difference frequency products, a second double balanced modulator, and an R.F. band pass filter of linear phase-frequency characteristics for passing sum and difference frequency products, a translation channel having connected in series therein a first double balanced modulator, a low pass filter of linear phase-frequency characteristics for passing only difference frequency products, a second double balanced modulator, an audio bandpass filter of linear phase-frequency characteristic for passing sum and difference frequency products, a third double balanced modulator, and an R.F. bandpass filter of linear phase-frequency characteristic for passing only sum frequency products, a source of stable reference carrier intermediate frequency $F_c$, frequency synthesis means connected to receive said carrier intermediate frequency and providing therefrom an audio signal, $F_m$, where $F_m$ represents the mid-base band frequency of said band of audio information signals, a lagging 90° phase shift network, a product multiplier having a pair of inputs and one output, said output connected to the carrier input of said second double balanced modulator of said translation channel, a first transfer means connecting the audio frequency signal $F_m$ output of said synthesis means to the carrier input of said first double balanced modulator of said direct channel, and to the input of said 90° phase shift network for producing an output therefrom in quadrature with said audio $F_m$ signal, and to one input of said product multiplier, a second transfer means connecting the phase shift quadrature output of said phase shift network to the carrier input of said first double balanced modulator of said translation channel and to the other input of said product multiplier, a dual frequency coherent signal generator having a modulation input and a carrier input and a pair of outputs, said modulation input connected to receive the output of said synthesis means, $F_m$, and said carrier input connected to receive said intermediate frequency, $F_c$, providing at the outputs thereof a pair of coherent oppositely offset carrier signals of $(F_c+F_m)$ and $(F_c-F_m)$, being a pair of signals differing in frequency by twice said audio signal $F_m$, a third transfer means having the higher frequency $(F_c+F_m)$ output of said coherent generator connected to the carrier input of said second double balanced modulator of said direct channel and the lower frequency $(F_c-F_m)$ output connected to the carrier input of said double balanced modulator of said translation channel, amplitude equalization and time delay compensation means having its input connected to the output of said R.F. bandpass filter of said direct channel, a linear sum combining network having a pair of inputs and one output, one input connected to the output of said equalization and compensation means and the other input to the output of said R.F. bandpass filter of said translation channel, whereby the resulting output of said combining network being a single sideband output having a frequency content above said reference intermediate frequency, $F_c$, that content representing the transposition of said band of audio information signals when applied simultaneously to the modulation signal inputs of said first double balanced modulators of said direct and said translation channels.

2. The modulation system according to claim 1 wherein the outputs of said coherent generator are interchanged, said R.F. bandpass filter of said direct channel passing only difference frequency products, said R.F. bandpass filter of said translation channel passing sum and difference frequency products, said compensation means having its input connected to the output of said R.F. bandpass filter of said translation channel, said linear sum combining network having said other input connected to the output of said R.F. bandpass filter of said direct channel, whereby the resulting output of said combining network being a single sideband output having frequency content below said reference intermediate frequency, $F_c$, that content representing the transposition of said band of audio information signals when it is simultaneously applied to the modulation signal inputs of said first double balanced modulators of said direct and said translation channels.

3. A method for generating a single sideband information bearing signal which comprises the steps of:

generating an audio information signal frequency band, translating said audio signal frequency band into signal band of one-half frequency bandwidth with all of said information, frequency converting said signal band of one-half frequency bandwidth to an R.F. signal to provide the full band signal including sum and difference products thereof, compensating said full band signal for phase and amplitude differences, simultaneously translating in quadrature said audio signal frequency band into signal band of one-half frequency bandwidth all of said information, frequency converting in quadrature said simultaneously translated signal band into another audio frequency band signal to provide the sum and difference frequency products, transposing said quadrature converted audio band signal to an R.F. signal to provide one sideband of the double sideband outputs thereof, linearly combining said one sideband of the double sideband outputs and said compensated full band output.

4. The method according to claim 3 wherein said double sideband output is the sum frequency product.

5. The method according to claim 3 wherein said double sideband output is the difference frequency product.

6. An independent sideband modulation system having a voice channel for a band of voice signals and a non-voice channel for a band of audio information signals which comprises:

a direct channel including in series connection a first double balanced modulator, a low pass filter of linear phase-frequency characteristic for passing only difference frequency products, one input of a linear channel combiner means having a pair of inputs, a second double balanced modulator, and a R.F. bandpass filter of linear phase-frequency characteristic for passing the sum and difference frequency products of said audio information signals, a translation channel having connected in series therein a first double balance modulator, a low pass filter of linear phase-frequency characteristic for passing only difference frequency products, a second double balanced modulator, an audio bandpass filter of linear phase-frequency characteristic for passing sum and difference frequency products, a third double balanced modulator, and a R.F. bandpass filter of linear phase-frequency characteristics for passing only sum frequency products, a voice modulation channel including in series connection, a means for limiting the amplitude and frequency bandwidth of said voice signals, a double balanced modulator, an audio high pass filter for passing only sum frequency products, and an audio low pass filter having its output connected to the other input of said linear channel combiner means of said direct channel, a source of stable reference carrier intermediate frequency, $F_c$, frequency synthesis means connected to receive said carrier intermediate frequency $F_c$ and providing therefrom an audio signal, $F_m$, where $F_m$ represents the mid-base band frequency value of a band of said audio information signals, and of frequency limited band of said voice signals, a 90° phase shift network of the lagging type, a product multiplier having a pair of inputs and one output, said output connected to the carrier input of said second double modulator of said translation channel, a first transfer means connecting the audio signal output $F_m$ of said frequency synthesis means to the carrier input of said first double balanced modulator of said direct channel, and to the input of said 90° phase shift network for producing an output therefrom in quadrature with said audio signal $F_m$, and to one input of said product multiplier, and also to the carrier input of said double balanced modulator of said voice channel, a second transfer means connecting the phase shift quadrature output of said 90° phase shift network to the carrier input of said first double balanced modulator of said translation channel, and to the other input of said product multiplier producing an output therefrom of frequency $2F_m$, a dual frequency coherent signal generator having a modulation input and a carrier input and a pair of outputs, said modulation input connected to receive the audio signal output $F_m$ of said synthesis means, and the said carrier input connected to receive said carrier intermediate frequency $F_c$, providing at the outputs thereof a pair of coherent oppositely offset carrier signals of $(F_c+F_m)$ and $(F_c-F_m)$ frequency value, said pair of output signals differing in frequency by twice said audio signal $F_m$, a third transfer means connecting the higher frequency $(F_c+F_m)$ output of said coherent generator to the carrier input of said second double balanced modulator of said direct channel and the lower frequency $(F_c-F_m)$ output connected to the carrier input of said third double balanced modulator of said translation channel, amplitude equalization and time delay compensation means having its input connected to the output of said R.F. bandpass filter of said direct channel, a first linear sum combining network having a pair of inputs and one output, one input connected to the output of said equalization and compensation means and the other input connected to the output of said R.F. bandpass filter of said translation channel, an asymmetrical lower sideband filter connected to the output of said second double balanced modulator of said direct channel and passing therefrom only difference frequency products of said frequency limited band of said voice signals, a second linear sum combining network having a pair of inputs and one output, one input connected to the output of said first linear sum combining network and the other input connected to the output of said asymmetrical lower sideband filter, whereby the resulting output of said second combining network being an independent sideband signal having frequency content above said reference carrier intermediate frequency $F_c$, that content representing the transposition of said band of audio information signals when applied simultaneously to the modulation signal inputs of said first double balanced modulators of said direct and said translation channels, and having further frequency content below said reference carrier intermediate frequency $F_c$, that content representing the transposition of said frequency limited band of said voice signals when applied to the input of said voice channel.

7. A method for the simultaneous generation of a pair of single sideband signals bearing dissimilar intelligence, which comprises the steps of generating an audio information signal frequency band, simultaneously generating a frequency limited band of voice signals, translating said audio information signal frequency band into signal band of one-half frequency bandwidth with all of said information, simultaneously translating in quadrature said audio information signal frequency band into a quadrature signal form of said signal band of one-half frequency bandwidth containing all of said information, frequency converting in quadrature said quadrature signal form of said signal band of one-half frequency bandwidth into a full audio frequency band possessing sum and difference frequency products thereof, and higher in frequency than said signal band of one-half frequency bandwidth, simultaneously transposing said frequency limited band of voice signals into an audio voice frequency band having the same band limits as said full audio frequency band, linearly combining said signal band of one-half frequency bandwidth and said audio voice frequency band, up frequency converting combined said signal band of one-half frequency bandwidth and said audio voice frequency band into an R.F. signal consisting of the full band signal including sum and difference products thereof and double sideband outputs of said audio voice frequency band, sideband filtering only one of said double sideband outputs of said audio voice frequency band, up frequency converting said full audio frequency band to an R.F. signal constituting one of the full band double sideband outputs thereof, compensating said full band for phase and amplitude discrepancies from said one of the full band double sideband outputs, linearly summing said one of the full band double sideband outputs and the compensated full band output, linearly combining said linearly summing output and said sideband filtering output.

8. A single sideband demodulation system for radio frequency band representative of audio information signals which comprises:

a direct channel including therein in series connection, a first double balanced modulator, a low pass filter of linear phase-frequency characteristics for passing difference frequency products, and a second double balanced modulator;

a translation channel including in series connection therein, a first double balanced modulator, an audio bandpass filter of linear phase-frequency characteristics for passing difference frequency products, a second double balanced modulator, a low pass filter of linear phase-frequency characteristics for passing only difference frequency products, a third double balanced modulator;

means for generating a stable audio reference carrier frequency signal, $F_m$, where $F_m$ represents the midbase band frequency value of said band of audio information signals, means for generating from said audio reference carrier frequency, $F_m$, a pair of coherent oppositely offset carrier intermediate frequency signals of $(F_c+F_m)$ and $(F_c-F_m)$ frequency values, where $F_c$ represents the system intermediate frequency reference value, means for producing from said audio reference carrier frequency, $F_m$, the quadrature signal thereof, means for generating from said audio reference carrier frequency, $F_m$, the second harmonic signal, $2F_m$, thereof, means for producing from said second harmonic signal, $2F_m$, the quadrature signal thereof, a first transfer means connecting the higher frequency $(F_c+F_m)$ of said pair of offset carrier intermediate frequency signals to the carrier input of said first double balanced modulator of said translation channel and connecting the lower frequency $(F_c-F_m)$ of said pair of offset carrier intermediate frequency signals to the carrier input of said first double balanced modulator of said direct channel, second transfer means connecting said quadrature signal of said second harmonic $2F_m$ to the carrier input of said second double balanced modulator of said translation channel, third transfer means connecting said quadrature signal of said audio reference carrier frequency $F_m$ to the carrier input of said third double balanced modulator of said translation channel, fourth transfer means connecting said audio reference carrier frequency signal, $F_m$, to the carrier input of said second double balanced modulator of said direct channel, amplitude equalization and time delay compensation means having its input connected to the output of said second double balanced modulator of said direct channel, a linear sum combiner network having a pair of inputs and one output, one input connected to the output of said equalization and compensation means and the other input connected to the output of said third double balanced modulator of said translation channel, whereby the resulting output of said combining network being demodulated frequency content of said band of audio information signals when said radio frequency band having frequency content representative of said audio information signals above said system intermediate frequency, $F_c$, is applied simultaneously to the modulation signal inputs of said first double balanced modulators of said direct and said translation channels.

9. A four-channel output independent sideband transmission system having as one channel a multiplex channel time sharing voice information and audio information signals which comprises:

a speech channel including connected in series a first means for limiting the amplitude and frequency bandwidth of speech signals, a first double balanced modulator, an audio bandpass filter for passing only sum frequency products, one input of a linear speech channel combiner having two inputs and one output, a linear direct channel combiner having two inputs and one output, a second double balanced modulator, a first asymmetrical lower sideband filter for passing only difference frequency products representative of said speech signals, amplitude and frequency bandwidth limiting means of linear phase-frequency characteristics for a band of audio information signals and a band of voice information signals;

an intermediate quadrature information channel of linear phase-frequency characteristics having connected in tandem therein:

a first double balanced modulator having its input connected to the output of said means for limiting amplitude and frequency bandwidth of said band of audio information signals, a low pass filter for passing only difference frequency products of said audio information signals, a second double balanced modulator, a first single pole double throw switch means having a movable arm and first and second stationary contacts, said first contacts connected to the output of said second double balanced modulator of said quadrature channel, an audio bandpass filter connected to said arm of said first switch means and passing only sum frequency products of said voice information signal and sum and difference products representative of audio information signals, a linear information channel combiner having two inputs and one output, a third double balanced modulator, a first R.F. bandpass filter for passing only sum frequency products representative of said audio information signals;

a direct information channel of linear phase-frequency characteristics including connected in tandem therein, a first double balanced modulator having a pair of output paths and having its input connected to the output of said first means for limiting amplitude and frequency bandwidth of said band of audio information signals, a low pass filter for passing only difference frequency products of said audio information signals connected to one of said pair of output paths of said first double balanced modulator, the other of said pair of output paths connected to said second contact of said first switch means of said intermediate quadrature information channel, a second single pole double throw switch means having a movable arm and first and second stationary contacts, said arm connected to output of said low pass filter and first contact connected to the other input of said linear direct channel combiner of said speech channel;

a pair of voice modulation outboard channels, each including in tandem connection therein a means for limiting the amplitude and frequency bandwidth of voice signals, a double balanced modulator, and audio bandpass filter for passing only sum frequency products, a second double balanced modulator, and a second audio bandpass filter for passing only sum frequency products, where one second audio bandpass filter has its output connected to other input of said linear speech channel combiner of said speech channel, and the other second audio bandpass filter has its output connected to the other input of said linear information channel combiner of said intermediate quadrature information channel;

a source of stable reference carrier intermediate frequency, $F_c$, frequency synthesis means connected to receive said carrier intermediate frequency and providing therefrom an audio signal, $F_m$, where $F_m$ represents the mid-base band frequency value of said amplitude and frequency value of said amplitude and frequency bandwidth limited bands of said audio information, of voice information, of speech signals, a 90 degree phase shift network of the lagging type, a product multiplier having a pair of inputs and one output, said output connected to the carrier input of said second double balanced modulator of said intermediate quadrature information channel, a frequency doubler having its output connected to the carrier inputs of said second double balanced modulators of said pair of voice modulation outboard channels, a first transfer means connecting the audio signal $F_m$ output of said frequency synthesis means to the carrier inputs of said first double balanced modulators of said direct channel, said speech channel, and said pair of voice modulation channels, to the input of said 90° phase shift network for producing an output therefrom in quadrature with said audio signal $F_m$ to the input of said frequency doubler, and to one input of said product multiplier, a second transfer means connecting the phase shift quadrature output of said phase shift network to the carrier input of said first double balanced modulator of said intermediate quadrature information channel and to the other input of said product multiplier, a dual frequency coherent signal generator having carrier and modulation inputs and a pair of outputs, said modulation input connected to receive the audio signal output $F_m$ of said synthesis means, and the carrier input connected to receive said carrier intermediate frequency $F_c$, providing at the outputs thereof a pair of coherent oppositely offset carrier signals of $(F_c+F_m)$ and $(F_c-F_m)$ frequency value, said pair of signals differing in frequency by twice said audio signal $F_m$, a third transfer means connecting the higher frequency $(F_c+F_m)$ output of said coherent generator to the carrier input of said second double balanced modulator of said speech channel and the lower frequency $(F_c-F_m)$ output connecting to the carrier input of said third double balanced modulator of said intermediate quadrature information channel, a second asymmetrical lower sideband filter connected to the output of said second double balanced modulator of said speech channel for passing only difference frequency products representative of said voice signals of said voice modulation outboard channel connected to said speech channel, a first asymmetrical upper sideband filter connected to the output of said third double balanced modulator of said intermediate quadrature information channel for passing only sum frequency products representative of said voice information signals, a second asymmetrical upper sideband filter connected to the output of said third double balanced modulator of said intermediate quadrature information channel for passing only sum frequency products representative of said voice signals of said voice modulation outboard channel that is connected to said intermediate quadrature information channel, a second R.F. bandpass filter of linear phase-frequency characteristics connected to the output of said second double balanced modulator of said speech channel for passing sum and difference frequency products representative of said limited frequency bandwidth audio information signals, amplitude equalization and time delay compensation means having its input connected to the output of said second R.F. bandpass filter, a first linear sum combining network having a pair of inputs and one output, one input connected to the output of said equalization and compensation means and the other input connected to the output of said first R.F. bandpass filter of said intermediate quadrature information channel, third switch means having a movable arm and first and second stationary contacts, said arm connected to the output of said first asymmetrical upper sideband filter of said intermediate quadrature information channel, fourth switch means having a movable arm and first and second stationary contacts, said arm connected to the output of said first linear sum combining network, a source of voice information signals, a source of stored audio information signals, a fifth switch means having a movable arm and first and second stationary contacts, said first contact connected to the output of said source of stored audio information signals and said second contact connected to said source of voice information signals and said arm connected to the input of said means of limiting amplitude and frequency bandwidth of a band of audio information signals and band of voice information signals, a voice operated switch means connected to the output of said means of linear phase-frequency characteristic for limiting amplitude and frequency bandwidth of audio information signal band and voice information signal band, and coupled said first second, third, fourth, and fifth switch means for alternation thereof between said first and second stationary contacts, a second linear sum combining network having a pair of inputs and one output, one of said inputs connected to the output of said second asymmetrical upper sideband filter and said second stationary contact of said third switch means, and the other of said inputs connected to the outputs of said first and said second asymmetrical lower sideband filters, a third linear sum combining network having two inputs and one output, one input connected to the output of said second linear sum combining network, and the other input connected to said first stationary contact of said fourth switch means whereby the resulting output of said third combining network being a multichannel independent sideband signal having one multiplex channel time sharing voice information and audio information signals as voice information controlled alternation occurs between said first and said second contacts of said ganged switches.

References Cited

UNITED STATES PATENTS

| | | | |
|---|---|---|---|
| 2,903,518 | 9/1959 | Kahn. | |
| 2,944,113 | 7/1960 | Wehoe et al. | |
| 3,195,073 | 7/1965 | Penn | 325—137 |

OTHER REFERENCES

Wright, "The Third Method of S.S.B.," QST, September 1957, pages 11–15.

Weaver, "A Third Method of Generation and Detection of Single-Sideband Signals," proceedings of the IRE, December 1956, pp. 1703–05.

ROBERT L. GRIFFIN, Primary Examiner

J. A. BRODSKY, Assistant Examiner

U.S. Cl. X.R.

179—15; 325—137; 332—45